US00RE48756E

(19) United States
(12) Reissued Patent
Cutsforth

(10) Patent Number: US RE48,756 E
(45) Date of Reissued Patent: Sep. 28, 2021

(54) SYSTEM AND METHOD FOR MONITORING THE STATUS OF ONE OR MORE COMPONENTS OF AN ELECTRICAL MACHINE

(71) Applicant: CUTSFORTH, INC., Cohasset, MN (US)

(72) Inventor: Robert S. Cutsforth, Bellingham, WA (US)

(73) Assignee: CUTSFORTH, INC., Cohasset, MN (US)

(21) Appl. No.: 16/393,079

(22) Filed: Apr. 24, 2019

Related U.S. Patent Documents

Reissue of:

(64) Patent No.: 9,640,930
Issued: May 2, 2017
Appl. No.: 14/982,480
Filed: Dec. 29, 2015

U.S. Applications:

(63) Continuation of application No. 13/802,969, filed on Mar. 14, 2013, now Pat. No. 9,252,643.

(51) Int. Cl.
*G08B 21/00* (2006.01)
*H01R 39/58* (2006.01)
(Continued)

(52) U.S. Cl.
CPC ..... *H01R 39/58* (2013.01); *H01R 39/381* (2013.01); *H02K 11/20* (2016.01)

(58) Field of Classification Search
CPC ..... H01R 39/58; H01R 39/381; H02K 11/20
See application file for complete search history.

(56) References Cited

U.S. PATENT DOCUMENTS 3,146,365 A * 8/1964 Millar ..... H01R 39/385 310/246
3,599,165 A * 8/1971 Wendell ..... H01R 35/025 439/164

(Continued)

FOREIGN PATENT DOCUMENTS

CN 1395343 A 2/2003
CN 101369706 A 2/2009

(Continued)

OTHER PUBLICATIONS

Wurfel et al. "Monitoring and diagnostics of the rotor slip ring system of three phase current induction generators" University of Technology Chemnitz, D-09126 Chemnitz, Germany.

(Continued)

*Primary Examiner* — Ovidio Escalante

(74) *Attorney, Agent, or Firm* — Seager, Tufte & Wickhem LLP

(57) ABSTRACT

A monitoring apparatus configured for monitoring a carbon brush of a brush holder assembly of an electrical machine. The monitoring apparatus may include a flexible sensor and a signal processing circuit for processing a signal received from the flexible sensor. The flexible sensor may have an electrical resistance that varies based on a radius of curvature of the flexible sensor, wherein the radius of curvature of the flexible sensor may be associated with a deflection of a spring providing a force to engage the carbon brush with a rotating component of the electrical machine. The signal processing circuit may be coupled to the sensor and may be configured to determine a measure of a wear state of the carbon brush using information about the variable resistance of the flexible sensor.

49 Claims, 12 Drawing Sheets

(51) Int. Cl.
*H02K 11/20* (2016.01)
*H01R 39/38* (2006.01)

(56) References Cited

U.S. PATENT DOCUMENTS

| | | | | | |
|---|---|---|---|---|---|
| 3,634,710 | A * | 1/1972 | Woda | H01R 39/40 | 310/239 |
| 4,636,778 | A | 1/1987 | Corkran et al. | | |
| 4,739,208 | A * | 4/1988 | Kimberlin | H01R 39/58 | 200/61.4 |
| 4,743,787 | A | 5/1988 | Bunner et al. | | |
| 5,157,372 | A | 10/1992 | Langford | | |
| 5,256,925 | A | 10/1993 | Cutsforth | | |
| 5,397,952 | A | 3/1995 | Decker et al. | | |
| 5,463,264 | A | 10/1995 | Koenitzer | | |
| 5,621,262 | A | 4/1997 | Han | | |
| 5,731,650 | A * | 3/1998 | Scheucher | H01R 39/58 | 310/242 |
| 5,753,992 | A | 5/1998 | Avitable et al. | | |
| 5,870,026 | A | 2/1999 | Challenger | | |
| 5,892,303 | A * | 4/1999 | Wayman | G03G 15/0818 | 307/147 |
| 6,359,690 | B1 | 3/2002 | Discenzo et al. | G01D 5/268 | 356/450 |
| 6,552,467 | B1 | 4/2003 | Suriano et al. | | |
| 6,731,042 | B1 | 5/2004 | Bank et al. | | |
| 6,933,650 | B2 | 8/2005 | Wang | H01R 39/58 | 310/239 |
| 6,960,922 | B2 | 11/2005 | Klaar | | |
| 7,034,430 | B2 | 4/2006 | Custforth et al. | | |
| 7,045,929 | B2 | 5/2006 | Yu | | |
| 7,248,142 | B2 | 7/2007 | Beck et al. | | |
| 7,277,004 | B2 | 10/2007 | Beck et al. | | |
| 7,705,744 | B2 | 4/2010 | Cutsforth | | |
| 7,880,362 | B2 | 2/2011 | Cutsforth et al. | | |
| 8,047,083 | B2 | 11/2011 | Puzio et al. | | |
| 8,054,190 | B2 | 11/2011 | Hobelsberger | | |
| 8,618,943 | B2 | 12/2013 | Cutsforth et al. | | |
| 9,252,643 | B2 * | 2/2016 | Cutsforth | H01R 39/58 | |
| 2003/0011388 | A1 * | 1/2003 | Klaar | H02K 11/25 | 324/723 |
| 2007/0273165 | A1 | 11/2007 | Beck et al. | | |
| 2008/0291273 | A1 | 11/2008 | Cutsforth et al. | | |
| 2012/0248929 | A1 | 10/2012 | Fish et al. | | |
| 2014/0009142 | A1 * | 1/2014 | Cauwenberghs | H02K 11/20 | 324/207.11 |

FOREIGN PATENT DOCUMENTS

| | | | |
|---|---|---|---|
| DE | 19755232 | A1 | 6/1999 |
| DE | 102012102726 | A1 | 10/2012 |
| EP | 1441422 | A2 | 7/2004 |
| EP | 1801938 | A2 | 6/2007 |
| SU | 1179464 | A1 | 9/1985 |
| WO | 2012119832 | A1 | 9/2012 |
| WO | 2012123402 | A1 | 9/2012 |

OTHER PUBLICATIONS

Authorized Officer Joël Basilé, International Search Report and Written Opinion for PCT/US2014/022526 dated Jun. 16, 2014, 12 pages.

Flexpoint Sensor Systems, Inc. "Bend Sensor Technology Electronic Interface Design Guide," pp. 1-14, 1997.

Flexpoint Sensor Systems, Inc. "Then or Now? The Thin, flexible Bend Sensor from Flexpoint offers limitless possibilities," 1999.

Flexpoint Sensor Systems "Bend Sensor Technology Mechanical Application Design Guide," 10 pgs, 1997.

Japanese Laid-Open Utility Model Publication No. 2-110975, Sep. 5, 1990, 15 pages.

* cited by examiner

SYSTEM AND METHOD FOR MONITORING THE STATUS OF ONE OR MORE COMPONENTS OF AN ELECTRICAL MACHINE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The present application is a continuation application of U.S. patent application Ser. No. 13/802,969, filed Mar. 14, 2013, the complete disclosure of which is herein incorporated by reference.

TECHNICAL FIELD

The disclosure generally relates to monitoring systems for monitoring brushes and brush holder assemblies that may be used in electrical devices and/or slip ring assemblies. More specifically, the disclosure relates to monitoring apparatus, assemblies, systems and methods of monitoring the wear of a brush in a brush holder assembly and/or the condition of a slip ring of an electrical device using a flex sensor.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, or sliding connection applications, for example, slip ring assemblies on a rotating machine such as a rotating crane or a linear sliding connection on a monorail. Brushes in many electrical devices are blocks or other structures made of conductive material, such as graphite, carbon graphite, electrographite, metal graphite, or the like, that are adapted for contact with a conductive surface or surfaces to pass electrical current. Electrically conductive leads or shunts extend from the brush to provide an electrical pathway to and/or from the brush from another conductive member.

In some designs, a brush box type brush holder, or other type of brush holder, may be used to support a brush in contact with a moving contact surface of an electrical device during operation. The brush and brush box may be designed such that the brush can slide within the brush box to provide for continuing contact between the brush and the moving contact surface contacted by the brush. During operation an anomalous and/or threshold condition may occur, which may be indicative that one or more components of the electrical device may need to be replaced, one or more components of the electrical device may require inspection or attention, and/or maintenance may need to be performed. For example, an anomalous and/or threshold condition may indicate that one or more of a brush, brush holder, spring, shunt, commutator, collector ring, and/or other component may need to be replaced, one or more of a brush, brush holder, spring, shunt, commutator, collector ring, and/or other component may need to be inspected, and/or maintenance may need to be performed. It would be advantageous to monitor one or more components of an electrical device in order to observe the occurrence of an anomalous and/or threshold condition. Furthermore, it would be advantageous to alert an operator and/or technician of the occurrence of an anomalous and/or threshold condition and/or schedule technician intervention.

SUMMARY

The disclosure is directed to monitoring apparatus, assemblies, systems and methods of monitoring the wear of a brush in a brush holder assembly and/or the condition of a slip ring of an electrical device using a flex sensor. Accordingly, one illustrative embodiment is a monitoring apparatus configured for monitoring a carbon brush of a brush holder assembly of an electrical machine. The monitoring apparatus may include a flexible sensor and a signal processing circuit for processing a signal received from the flexible sensor. The flexible sensor may have an electrical resistance that varies based on a radius of curvature of the flexible sensor, wherein the radius of curvature of the flexible sensor may be associated with a deflection of a spring providing a force to engage the carbon brush with a rotating component of the electrical machine. The signal processing circuit may be coupled to the sensor and may be configured to determine a measure of a wear state of the carbon brush using information about the variable resistance of the flexible sensor.

Another illustrative embodiment is a system for monitoring a wear state of one or more carbon brushes associated with an electrical machine and/or a wear state of a rotating component of the electrical machine. The system may include one or more brush holder assemblies associated with the electrical machine and a site monitor for receiving wear state information from the one or more brush holder assemblies. Each of the brush holder assemblies may include a carbon brush, a spring adjacent to the carbon brush, a flexible sensor positioned adjacent to the spring and a wear state monitor coupled to the flexible sensor. The spring may be configured to provide a force to the carbon brush such that the carbon brush engages a rotating component of the electrical machine. The flexible sensor may have an electrical resistance that varies based on a radius of curvature of the flexible sensor. The radius of curvature may be representative of a physical position and/or movement of the carbon brush. By monitoring the physical position, and/or the movement of the carbon brush, such as by monitoring a measure (e.g., a resistance, a voltage, a current, etc.) associated with the radius of curvature of the bend sensor, a wear state of the carbon brush and/or a wear state of the rotating component of the electrical machine may be determined. The wear state monitor may be configured for determining a measure of a wear state of the carbon brush using the variable resistance of the flexible sensor. The site monitor may be communicatively coupled with the wear state monitor of the one or more brush assemblies for receiving wear state information about the carbon brushes of the one or more brush assemblies and communicating the wear state of the one or more carbon brushes to a user.

An illustrative method for monitoring a wear state of one or more components of an electrical device may include obtaining a variable resistance value from a flexible resistor for sensing the movement of a carbon brush in relation to a rotating component of the electrical device, comparing the variable resistance value to a threshold value to determine a wear state of the carbon brush, and communicating an indication of the wear state of the carbon brush to a user.

Another illustrative embodiment may be a brush holder assembly having an integral sensor for monitoring a wear state of a carbon brush or an associated rotating component of an electrical machine. The brush holder assembly may include a carbon brush, a spring for providing a force to engage the carbon brush with a rotating component of an electrical machine and a wear state sensor. The wear state sensor may include a bend sensor, a comparator, an indicator and a communication circuit. The comparator may compare a signal received from the bend sensor to a predetermined threshold value to determine a wear state of at least one of the carbon brushes and the rotating component of the electrical machine. The indicator may provide an indication of the wear state of at least one of the carbon brushes and the rotating component of the electrical machine to a user. The communication circuit may communicate information about the wear state of at least one of the carbon brushes and the rotating component of the electrical machine to a site monitor proximal to the electrical machine.

The above summary of some example embodiments is not intended to describe each disclosed embodiment or every implementation of the aspects of the disclosure.

BRIEF DESCRIPTION OF THE DRAWINGS

The aspects of the disclosure may be more completely understood in consideration of the following detailed description of various embodiments in connection with the accompanying drawings, in which.

Figure 1:
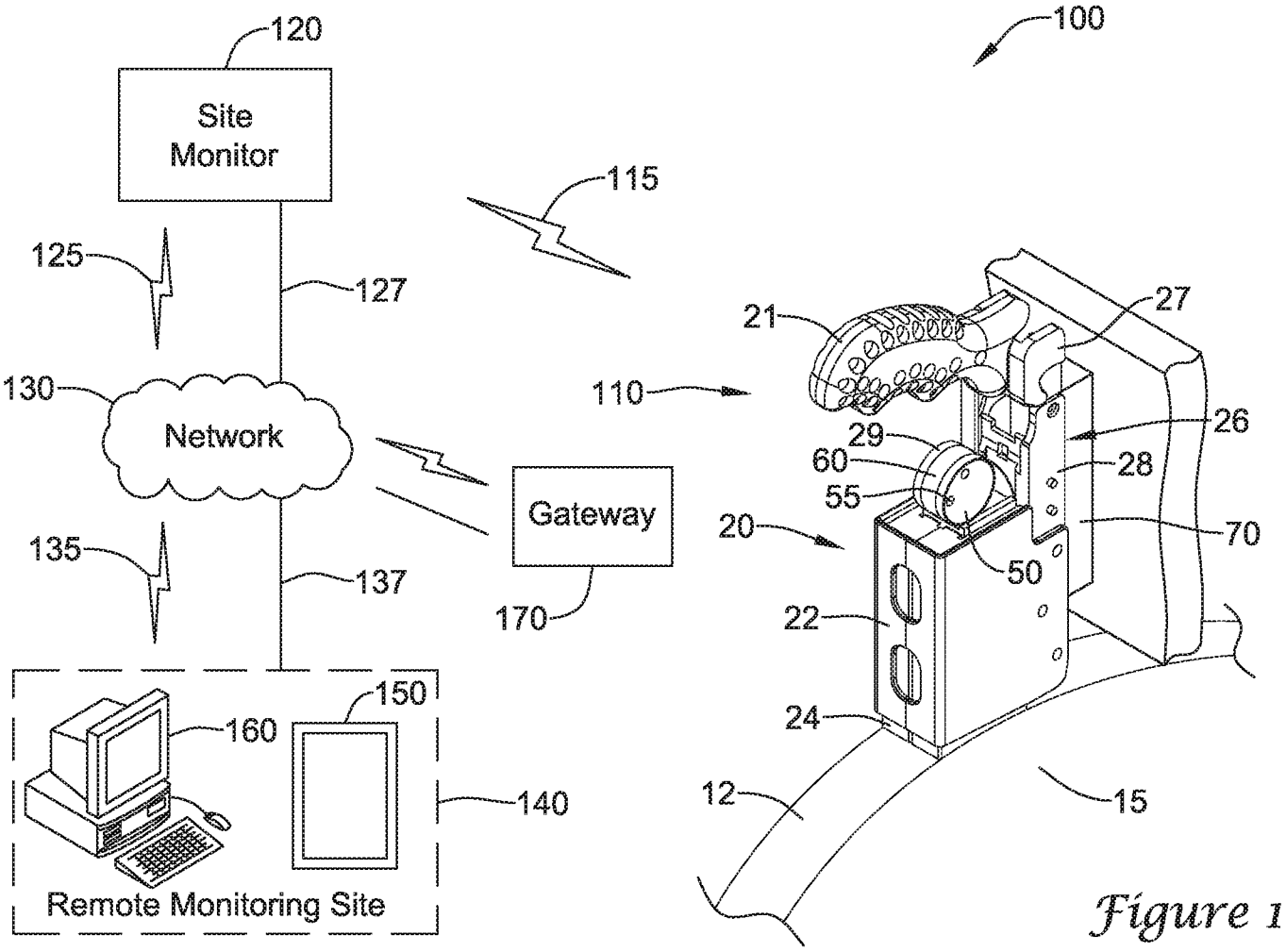
FIG. 1 shows an illustrative view of an exemplary brush monitoring system.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

FIG. 1 shows an illustrative view of an exemplary brush monitoring system 100 that may include a brush holder assembly 110, a site monitor 120 and/or a remote monitoring site 140 including a remote monitoring device 150, 160. In some cases, the brush holder assembly 110 may substantially resemble a brush holder assembly as described in U.S. Pat. No. 7,034,430, entitled "BRUSH HOLDER APPARATUS, BRUSH ASSEMBLY, AND METHOD", which is herein incorporated by reference in its entirety. However, the illustrative brush monitoring system 100 may be amenable to any of various brush holder assembly configurations. Thus, the intention is that the illustrative brush monitoring system 100 may be used in conjunction with any desired brush holder assembly configurations of an electrical device, such as an industrial electrical generator. For example, the illustrative brush monitoring system 100 may be used with brush holder assemblies, brush holders and/or brushes disclosed in U.S. Pat. Nos. 6,731,042; 5,753,992; 5,621,262; 5,463,264; 5,397,952; and 5,256,925; each of which is incorporated herein by reference.

The brush holder assembly 110, for example as shown in FIG. 1, may include a brush holder 22, such as a brush box, surrounding a brush 24 on several sides and including a plurality of guiding surfaces for guiding linear or longitudinal movement of the brush 24. In some embodiments, the brush holder 22 may not take on the form of a box, but may include one or a plurality of guiding surfaces, such as channels, posts or columns, abutting and/or encompassing one or more sides of the brush 24 and/or extending into or through the brush 24, or a portion thereof, for guiding linear or longitudinal movement of the brush 24.

The brush holder 22 may be secured to a mounting beam 26 configured and adapted to be mounted to another structure, such as a mounting block 70. The brush holder assembly 110 may be configured to place the brush 24 in contact with a conductive surface 12, such as a surface of a rotating component 15 of an electrical machine, such as a collector ring, a slip ring, or a commutator, and conduct current therefrom. The brush 24 may extend from the lower edge of the brush holder 22 such that a wear surface of the brush 24 engages the conductive surface 12. The mounting beam 26 may include an over-center engagement mechanism, a slotted or channeled engagement mechanism for sliding engagement, or other mechanism for easily engaging and disengaging the brush 24 from a conductive surface 12. In other embodiments, the brush holder assembly may include a brush holder rigidly mounted to another structure holding the brush holder stationary, or mounted to another structure in any desired arrangement. For example, in some embodiments the brush holder may be bolted or welded to a stationary structure. Some such brush holders are disclosed in U.S. Pat. Nos. 6,731,042; 5,753,992; 5,621,262; 5,463,264; 5,397,952; and 5,256,925; which are incorporated herein by reference.

As shown in FIG. 1, the mounting beam 26 may include an upper beam member 27 and a lower beam member 28 hingedly or pivotedly coupled to one another. When the upper beam member 27 and the lower beam member 28 are aligned with one another (e.g., the longitudinal axis of the upper beam member 27 is parallel with the longitudinal axis of the lower beam member 28), the brush holder 22 may be considered to be in an engaged, or locked, position such that the brush 24 may be contiguous with or in contact with the conductive surface 12. When the upper beam member 27 is tilted from the lower beam member 28 (e.g., the longitudinal axis of the upper beam member 27 is oblique to the longitudinal axis of the lower beam member 28), the brush holder 22 may be considered to be in a disengaged, or unlocked, position such that the brush 24 may be non-contiguous with, spaced from, or otherwise not in direct electrical contact with the conductive surface 12. The mounting beam 26 may be removably coupled to the mounting block 70 during operation. In some embodiments, the mounting beam 26 may slidably engage with, interlock with, or otherwise be removably coupled to the mounting block 70. The mounting block 70 may be coupled to, secured to, or otherwise extend from another structure which maintains the mounting block 70 stationary with respect to the conductive surface 12, for example.

In some embodiments, a handle 21 may be attached to the brush holder 22 to facilitate engagement and disengagement of the brush 24 from the conductive surface 12. For example, the handle 21 may be attached to the upper beam member 27 such that movement of the handle 21 actuates (e.g., pivots, slides, releases) the upper beam member 27 relative to the lower beam member 28. The handle 21 may be a removable handle or the handle 21 may be permanently attached to the upper beam member 27 or another portion of the brush holder 22.

Also illustrated in FIG. 1 is a spring 29, such as a constant force spring, which provides tension to the brush 24 to bias the brush 24 toward and in contact with the conductive surface 12. The spring 29 may be attached to a portion of the brush holder 22 or the mounting beam 26 of the brush holder assembly 110, for example. In some embodiments, the spring 29 may extend along one side surface of the brush 24 between the brush 24 and the mounting beam 26 of the brush holder assembly 110.

Figure 3:
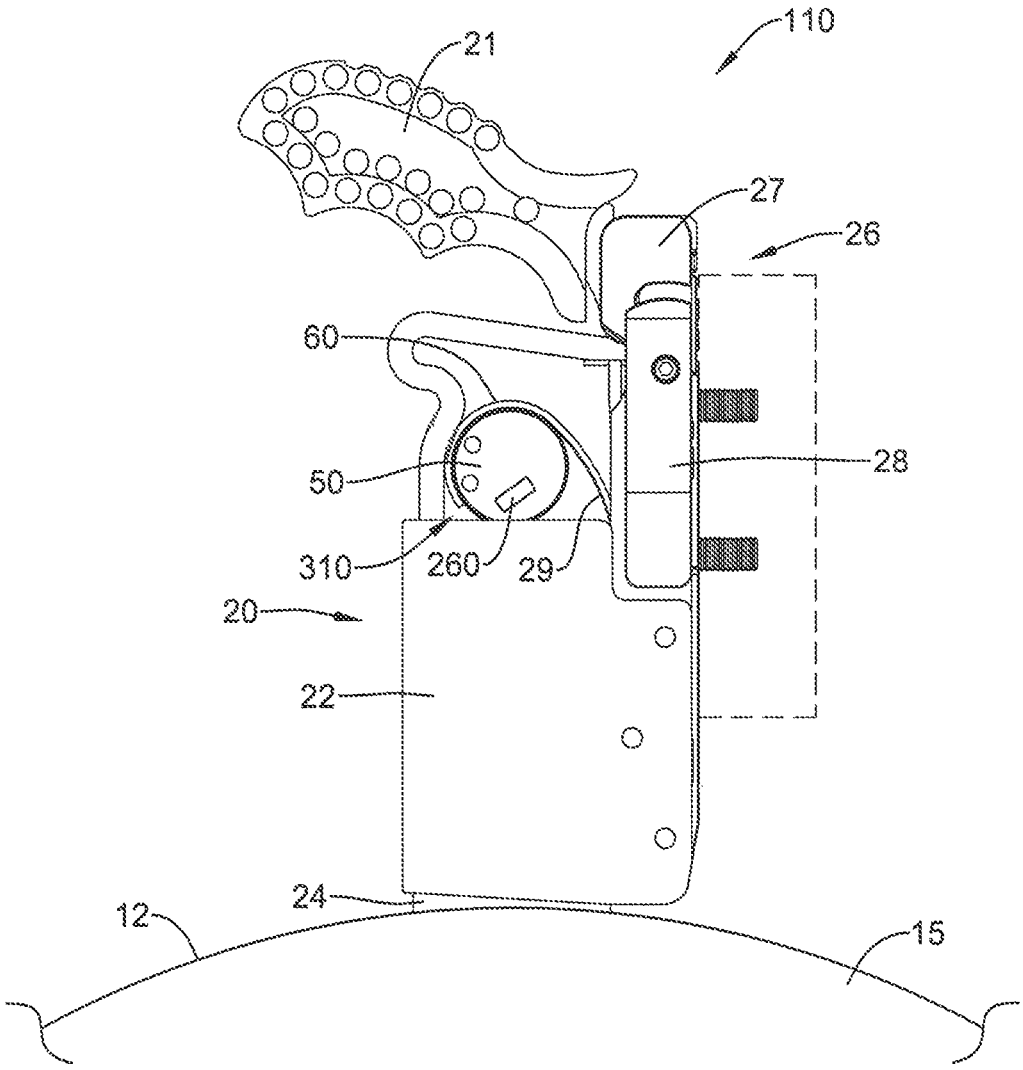
FIG. 3 shows a side view of the brush holder assembly including the illustrative wear state sensor of FIGS. 1 and 2.

The brush holder assembly 110 may further include a wear state monitor 50 and a flexible sensor 60, wherein the wear state monitor 50 may be communicatively coupled to the flexible sensor 60. For example, the wear state monitor 50 may receive a signal representative of the position and/or movement of the brush 24. In some cases, the wear state monitor 50 may be positioned adjacent to the spring 29. For example, the wear state monitor 50 may be mounted adjacent a surface of the spring 29 or otherwise with the spring 29, such as within a coil formed by the spring 29, as shown in FIG. 3. The wear state monitor 50 may include one or more indicators 55 to communicate the physical status of the brush 24, the conductive surface 12, or both. In some cases, the indicators 55 may include one or more light emitting diodes (LEDs), a speaker, or a combination of LEDs and/or speakers for communicating wear state information to a user. In some cases, the wear state monitor 50 may be positioned adjacent to a surface of a component of the brush holder assembly 110, different than the spring 29. For example, the wear state monitor 50 may be positioned on or adjacent to the brush holder 22, the lower beam member 28, the upper beam member 27, on or adjacent to one or more shunts of the brush holder assembly 110, and/or on or adjacent to the handle 21 of the brush holder assembly 110. In some cases, the wear state monitor 50 may be permanently and/or removably incorporated into a portion of the handle 21 or other component of the brush holder assembly 110.

The flexible sensor 60 may also be positioned adjacent to the spring 29, such that a movement of the brush 24 may cause the flexible sensor 60 to flex or otherwise change shape. For example, a proximal end of the flexible sensor 60 may be attached to a portion of the brush holder 22 or the mounting beam 26 of the brush holder assembly 110 and a distal end may be attached to and/or communicatively coupled to the wear state monitor 50. In some cases, the flexible sensor 60 may be attached to, embedded in, in contact with the spring 29 and track or follow the movement of the brush 24. For example, the flexible sensor 60 may be affixed to a surface (e.g., an inner surface, an outer surface, etc.) of the spring 29. In another example, the flexible sensor 60 may be positioned adjacent to the spring 29. As such, any movement of the flexible sensor 60 may directly correspond to movement of the brush 24.

For example, a signal corresponding to the resistance value of the flexible sensor 60 may be equivalent, proportional, or otherwise representative of the linear or longitudinal movement, vibration and/or diminution of the brush 24. In some cases, the wear state monitor 50 may associate a steady-state resistance value of the flexible sensor 60 with a wear state of the brush 24 and/or a transient resistance value with a wear state of the conductive surface 12 and/or the rotating component 15. The steady state resistance value of the flexible sensor 60 may correspond to a value obtained over one or more revolutions of the rotating component 15 and may correspond to the position of the upper surface of the brush 24 relative to the conductive surface 12 of the rotating component 15. In some cases, the transient resistance value of the flexible sensor 60 may correspond to a value obtained over at least a portion of a revolution of the rotating component 15, such as a resistance value caused by a vibration of the brush 24 caused by variances in the conductive surface 12 of the rotating component 15. The steady-state electrical value (e.g., a voltage level) may be compared to one or more predetermined threshold values to determine a wear state of the brush 24. Similarly, the transient electrical value may be associated with a vibration of the brush 24 and may be monitored and/or compared to one or more predetermined thresholds to determine a wear state of the conductive surface 12 of the slip ring or other rotating component of the electrical machine.

The flexible sensor 60 may have an electrical resistance that varies based on a radius of curvature of the flexible sensor 60 and may produce a signal (e.g., a voltage based signal, a current based signal, etc.) corresponding to the electrical resistance of the flexible sensor 60. In some cases, the radius of curvature of the flexible sensor 60 may be associated with a deflection of the spring 29 providing a force to engage the carbon brush with a rotating component of the electrical machine. The electrical resistance of the flexible sensor 60 may be used with other electrical components to provide a signal representative of the electrical resistance of the flexible sensor 60. For example, the resistance of the flexible sensor 60 may be used as a component in a voltage divider circuit that is configured to provide a voltage signal that corresponds to the variable resistance of the flexible sensor 60. In other cases, an electrical circuit associated with the flexible sensor 60 may be configured to provide a current signal representative of the variable electrical resistance of the flexible sensor 60.

In some cases, the brush monitoring system 100 may include a site monitor 120 that may be positioned near the electrical machine to monitor the wear state of one or more brush holder assemblies 110 and/or the wear state of the slip ring or other rotating component of the electrical machine. The site monitor 120 may be capable of monitoring the wear states of the brush 24 of the brush holder assembly 110. In some cases, the site monitor 120 may be capable of monitoring the movement of the brushes 24 of two or more brush assemblies 110 associated with one or more electrical machines. For example, the site monitor 120 may be communicatively coupled to one or more wear state monitors 50 associated with a particular electrical machine, such as the wear state monitor 50 of the brush holder assembly 110 via a communication link 115 (e.g., a wireless link). The site monitor 120 may be configured to receive processed data and/or raw data providing information about the wear state of the brush 24 and/or the rotating component 15. For example, the site monitor 120 may receive information about a comparison between a value received from the flexible sensor 60 and one or more predetermined thresholds, the value received from the flexible sensor 60, or both. In some cases, the communication link 115 may include a radio frequency (RF) communication link, an audio-based communication link (e.g., an ultrasonic communication link), and/or an optical communication link (e.g., an infrared (IR) communication link, a visible light communication link, etc.). In some cases, the site monitor 120 may be configured to predict or determine an estimated projection of a condition of the brush 24 into the future.

In some cases, the wear state monitor 50 may be configured to communicate the wear state information about the brush 24 and/or the rotating component 15 of the electrical machine to the site monitor 120 using a predetermined schedule (e.g., once per hour, once per day, twice per week, etc.). In some cases, the wear state monitor 50 may provide the wear state information about the brush 24 and/or the rotating component 15 of the electrical machine to the site monitor 120 in response to a command received from the site monitor 120 and/or the remote monitoring device 150, 160.

The site monitor 120 may output an indication of the condition and/or projected condition of the brush 24. In some cases, the indication may be configured to alert an operator, technician and/or other personnel that the brush 24 and/or the rotating component 15 are sufficiently worn and/or needs to be replaced, the brush 24 and/or the rotating component 15 are damaged, failure has occurred or is imminent, or other maintenance or inspection may need to be performed. In some embodiments, the indication may be used for scheduling maintenance or inspection, sending personnel to perform maintenance or inspection, ordering and/or scheduling distribution/delivery of a replacement brush or other part, routing maintenance personnel and/or product delivery to a specified location, or arranging for other notification and/or scheduling tasks be performed.

The brush monitoring system 100 may also be used to identify and/or notify other key maintenance, failure of the brush holder assembly 110 and/or other anomalous conditions. For example, incidents of excess heating, arcing or excess vibration, which may indicate a need to perform maintenance and/or disrupt operation of the electrical equipment, may be identified and/or assessed by one or more components of the brush monitoring system 100. The wear state monitor 50, the site monitor 120 and or the remote monitoring device 150, 160 may carry out an appropriate response to respond to an identified anomalous condition in an attempt to rectify the anomalous condition. In some cases, an operator may carry out an appropriate response to respond to an anomalous condition identified with the brush monitoring system 100 in an attempt to rectify the anomalous condition.

In some cases, the site monitor 120 may be communicatively coupled by a wireless link 125 and/or wired link 127 to a network 130. The site monitor 120 may be capable of communicating information about the wear state of one or more brushes to a remote monitoring device 150, 160 at a remote monitoring site 140 via the network 130 and one or more wired 137 and/or wireless 135 communication links. The wired link 127, 137 and/or wireless link 125, 135 communication links may be configured to operate using one or more standardized communication protocols (e.g., Ethernet, Ethernet/IP, BACnet, Modbus, LonWorks, etc.), or proprietary communication protocols. Examples of a remote monitoring system are described in U.S. Pat. No. 7,705,744, entitled "MONITORING SYSTEMS AND METHODS FOR MONITORING THE CONDITION OF ONE OR MORE COMPONENTS OF AN ELECTRICAL DEVICE", and U.S. patent application Ser. No. 11/752,965 entitled "BRUSH HOLDER ASSEMBLY MONITORING APPARATUS, ASSEMBLY, SYSTEM AND METHOD" and has the U.S. Patent Publication No. 2008/0291273 which are herein incorporated by reference in their entirety. The remote monitoring site 140 may include one or more remote monitors, such as a personal computer 160, a workstation, a laptop, a tablet 150, a smart phone or the like, for collecting data and/or analyzing data received from one or more user sites.

The remote monitoring devices and/or site monitor 120 may be integrated into a maintenance program for a brush holder assembly 110, such that the site monitor 120 may be configured to monitor at least a condition of one or more components of the brush holder assembly 110. To do so, the remote monitors and/or the site monitor 120 may be configured to identify each brush holder assembly 110 on a particular machine or at a particular site and/or store an installation date and any servicing dates for each brush holder assembly 110. In some cases, one or more parameters received from the wear state monitor 50 associated with a brush holder assembly 110 may be monitored over time to determine trending information about a brush 24 and/or a rotating component 15 of the electrical machine. For example, the site monitor 120 and/or the remote monitors may determine trend information, that may include an average lifetime for a brush 24 installed in a particular brush holder assembly 110 and/or for a particular installation position on an electrical machine. The site monitor 120 and/or the remote monitors may be configured to store information about the position of a brush (e.g., a resistance value of the flexible sensor 60), when the brush holder assembly 110 is first installed on an electrical machine. By monitoring the initial position each time a brush 24 is replaced in the brush holder assembly 110, information may be gathered about a wear state of the rotating component 15. For example, a slip ring, or other rotating component of the electrical machine, may have an initial outer diameter measurement. Over time, with wear including normal wear and/or due to environmental conditions (e.g., humidity, temperature, contaminants including abrasives, etc.) a wear state associated with the thickness and/or outer diameter of the rotating component 15 may be measured and/or predicted. In some cases, preventative measures to improve the lifetime of the brush 24 and/or the rotating component 15 may be obtained by analysis of the information received from the one or more wear state monitors 50. For example, a user may be advised to adjust one or more environmental conditions for a space near the electrical machine, such as a temperature, a humidity level and/or a contaminant level.

Figure 2B:
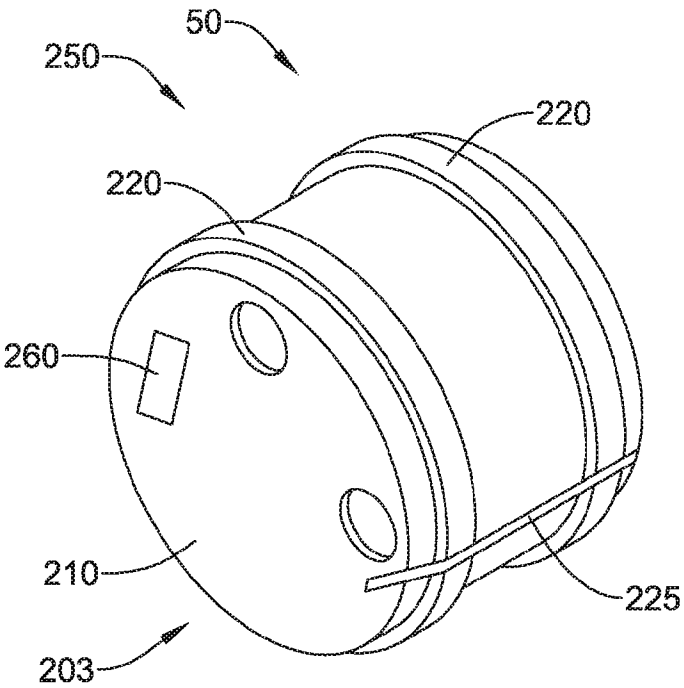
FIGS. 2A and 2B are perspective views of the illustrative wear state sensor of FIG. 1.
Figure 2A:
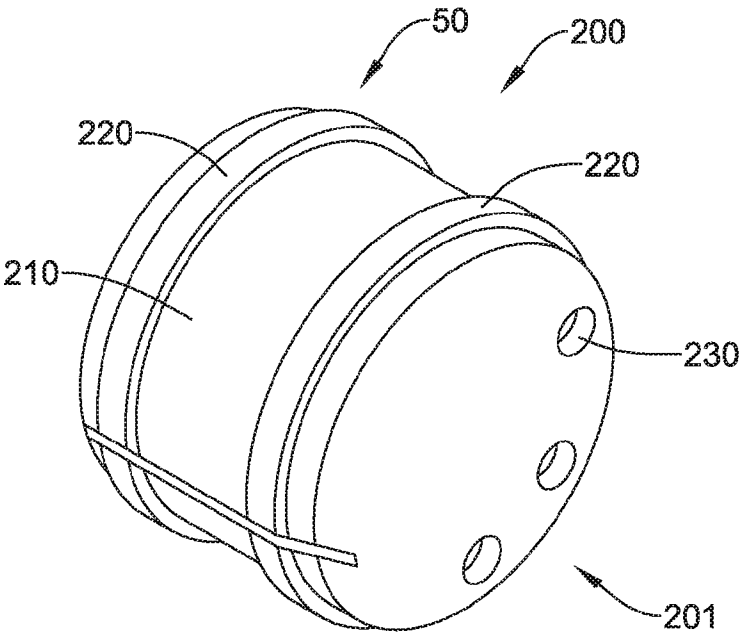

FIGS. 2A and 2B are perspective views 200, 250 of the illustrative wear state monitor 50 of FIG. 1. The wear state monitor 50 may include a body 210, one or more ribs 220, an opening 225 to facilitate an electrical connection to the flexible sensor 60, one or more communication interfaces 230, and one or more indicators 240. In some cases, the wear state monitor may include a user interface 260. The body 210 may be generally cylindrical, or other such shape designed to facilitate integration into a brush holder assembly 110 or other mounting location within the brush holder assembly 110. For example, the wear state monitor 50 may be configured to be associated with the spring 29 of the brush holder assembly 110, as shown in FIG. 3. The body 210 of the wear state monitor 50 may be designed to be captured within a coiled portion of the spring 29. The ribs 220, or other similar structure, may be used to ensure the wear state monitor 50 remains mounted within the coil. The ribs 220 may be removable, or otherwise configurable, to allow the wear state monitor 50 to be mounted within a coil of two or more different sized springs. For example, the removable and/or configurable ribs, such as the ribs 220, may allow the wear state monitor 50 to be mounted within a spring having a first width and a first coil diameter and/or a spring having a second width and/or a second diameter.

The opening 225 of the wear state monitor 50 may be used to facilitate a connection with the flexible sensor 60. For example, the opening 225 may allow access to an electrical connection, such as a screw terminal. The opening 225 may have a shape corresponding to a cross-sectional shape of the flexible sensor (e.g., a slot), or may be another shape (e.g., a circular opening, a rectangular opening, etc.) designed to accommodate an electrical connection to the flexible sensor 60.

As discussed above, the wear state monitor 50 may be configured to determine one or more wear states of the brush 24 and/or the rotating component 15 of the electrical machine using information obtained using the flexible sensor 60 (e.g., a variable resistance, a voltage signal, a current signal, etc.). In some cases, the wear state monitor 50 may include one or more electrical connections for providing an electrical connection to the flexible sensor 60. The electrical connections may be located within an interior space of the wear state monitor 50, such that the flexible sensor 60 may be integrated with the wear state monitor 50 and may extend through the opening 225 to provide a direct electrical connection between the wear state monitor 50 and a portion of the flexible sensor 60. In some cases, one or more wires (e.g., individual wires, a shielded twisted-pair cable, a ribbon cable, etc.) may extend through the opening 225 to facilitate an electrical connection to the flexible sensor 60. The electrical connections may be formed as a permanent and/or semi-permanent electrical connection, using solder, a conductive epoxy, screw terminals, spring terminals, a compression fitting, a snap fitting, a crimp fitting, or the like. The electrical connections may be accessible to a user with or without disassembly of at least a portion (e.g., a cover) of the wear state monitor 50. For example, a user may be capable of accessing a terminal via the opening 225 and/or by removing a removable cover that may comprise an end 201, 203 of the wear state monitor 50. The cover may be secured by a threaded connection, a snap-fit connection and/or one or more connectors (e.g., screws). In some cases, the exterior housing of the wear state monitor 50 may be configured in two or more sections that may be hingedly connected (e.g., a "clam shell" configuration), or otherwise movable relative to one another. In such cases, when the wear state monitor 50 is located within the coiled portion of the spring 29 (e.g., a helical spring), the force provided by the spring 29 may facilitate a compression connection or snap fit connection for the hingedly connected sections of the housing of the wear state monitor 50. Also, the force provided by the spring 29 may also facilitate a compression connection or other pressure based electrical connection between the wear state monitor 50 and the flexible sensor 60. In some cases, the flexible sensor 60 may be electrically connected to the wear state monitor using an interface (e.g., one or more terminals, one or more bonding pads, etc.) located at an end 201, 203 and/or on the body 210 of the wear state monitor 50. In some cases, an externally accessible electrical connection interface for the flexible sensor 60 may extend above the surface of the wear state monitor 50, or may be recessed in a cavity formed into the exterior surface of one or more of the ends 201, 203 or the body 210.

The wear state monitor 50 may be capable of communicating information about the wear state of the brush 24 and/or the rotating component 15 to a user via the communication interface 230 and/or the indicators 240. The communication interface 230 and/or the indicators 240 may be located at the same or different surface of the wear state monitor 50. For example, the communication interface 230 may be located at a first end 201 of the wear sensor and the indicators 240 may be located at a second end 203 of the wear state monitor, but this is not required. The communication interface 230 may be capable of transmitting information via one or more communication protocols using audio energy (e.g. an ultrasonic signal), radio frequency (RF) energy (e.g., an RF signal), and/or light energy (e.g., an optical signal, an infrared (IR) signal, etc.), or the like.

In some cases, the wear state monitor 50 may be capable of receiving messages from an external device, such as the site monitor 120 and/or a programming device located at the same site or at a remote location (e.g., a computer 150, a tablet 160, a smart phone, etc.). The messages may include commands, such as commands to send wear state information about the brush 24 and/or the rotating component 15, or commands for modifying information used by the wear state monitor 50. For example, a user may desire to modify one or more thresholds used to determine the wear state information of the brush 24 and/or the rotating component 15, and/or to reprogram the wear state monitor 50 by downloading instructions, tables and/or the like (e.g., compiled code). In some cases, the wear state monitor 50 may include one or more user interfaces 260 that may be used for programming or otherwise providing information about the location and/or function of the wear state monitor 50. For example, a user may use the user interface 260 as a programming interface to modify one or more thresholds and/or to reprogram the wear state monitor 50 rather than using the communication interface 230. For example, a user may connect a programming device via a cable or use one or more memory devices (e.g., a flash card, a universal serial bus (USB) drive, etc.) to download and/or upload information from the wear state monitor 50. In some cases, the user interface 260 may include one or more switches (e.g. a dual inline package (DIP) switch, a rotary position switch, etc.) to associate the wear state monitor 50 with a particular brush assembly 110 and/or a particular installed position at the electrical machine and/or at the customer site.

The indicators 240 may include one or more optical indicators (e.g. LEDs) and/or one or more audio indicators (e.g., a speaker) for providing an optical and/or audible indication of the wear state of the brush 24 and/or the wear state of the rotating component 15. For example, indicators 240 of the wear state monitor 50 may include one or more LEDs, wherein the one or more light emitting diodes (LED) may be configured to emit light of a first color when the wear state monitor 50 determines a first wear state of the brush 24 and to emit light of a second color when the wear state monitor 50 determines a second wear state of the brush 24. In some cases, additional colors may be used to indicate additional wear states of the brush 24. The indicators may use the same and/or different ones of the one or more LEDs to indicate the wear state information of the rotating component 15. For example, the one or more LEDs may be configured to emit light of a third color when the wear state monitor 50 determines a first wear state of the rotating component 15 and to emit light of a fourth color when the wear state monitor 50 determines a second wear state of the of the rotating component 15. In some cases, additional colors may be used to indicate additional wear states of the rotating component 15. In some cases, a first set of LEDs may be configured to provide wear state information about the brush 24 and a second set of LEDs for indicating wear state information about the rotating component 15

For example, the wear state monitor 50 may include one or more LEDs configured to emit light of a first color (e.g., green) when the wear state monitor 50 determines that the brush 24 has an operational wear state, to emit light of a second color (e.g., yellow) when the wear state monitor 50 determines that the brush 24 is approaching the replacement wear state, and to emit light of a third color (e.g., red) when the wear state monitor 50 determines that the brush 24 has reached the replacement wear state. In some cases, the wear state monitor 50 may be configured to illuminate a different number of LEDs and/or a pattern of LEDs, of the same or different colors, to indicate one or more particular wear state conditions of the brush 24 and/or the rotating component 15.

In another example, the wear state monitor 50 may be configured to provide a first audible indication of the wear state of the brush 24 (e.g., an intermittent tone) when the wear state monitor 50 determines that the brush 24 is approaching the replacement wear state, and to provide a second audible indication of the wear state of the brush 24 (e.g., a different intermittent tone, a tone at a different frequency, a steady tone, etc.) when the wear state monitor 50 determines that the brush 24 has reached the replacement wear state.

FIG. 3 shows an exploded perspective view of the brush holder assembly 110 in an engaged position and including the illustrative wear state monitor 50 of FIGS. 1 and 2. In some cases, the brush holder assembly 110 may include an integral flexible sensor 60 that may be used for monitoring a wear state of the brush 24 and/or an associated rotating component 15 of an electrical machine. The brush holder assembly 110 may include the brush 24 (e.g. a carbon brush) and a spring 29 associated with the brush 24. The spring 29 may provide a force to engage the brush 24 with a rotating component of an electrical machine, such as a slip ring, a commutator, and the like. For example, the spring 29 may include a coil portion 310 that may be used to apply the force to the brush 24. The wear state monitor 50 may be positioned adjacent to the spring 29. In some cases, the wear state monitor 50 may be positioned substantially within the coil 310.

In some cases, the flexible sensor 60 may be positioned adjacent to the spring 29 such that the changing bend radius of the spring 29 associated with the movement and/or wear of the brush 24 causes a corresponding bend radius on the flexible sensor 60. For example, the flexible sensor 60 may be affixed or otherwise positioned adjacent to a surface of the spring 29. In another example, the flexible sensor 60 may be positioned adjacent to an edge of the spring 29.

Other configurations for positioning the flexible sensor 60 in relation to the spring 29 and/or brush 25 may be contemplated. For example, a portion of the flexible sensor 60 may be affixed to one or more other components of the brush holder assembly 110 (e.g., the brush holder 22, the handle 21, the upper beam member 27, the lower beam member 28, and the like). In such cases, a different portion of the flexible sensor 60 may be communicatively coupled to the wear state monitor 50 located in the coil portion 310 of the spring 29 or other location of the brush holder assembly 110. In some cases, the flexible sensor 60 may have a first bend radius upon initial installation of the brush 24 that is less than the bend radius after the brush 24 is worn. In other cases, the flexible sensor 60 may have a first bend radius upon initial installation that is greater than the bend radius after the brush 24 is worn. In some instances, the flexible sensor 60 may have a configuration such that the bend sensor 60 does not have a bend radius, such as when the bend sensor 60 is substantially aligned along a plane. For example, the bend radius of the flexible sensor 60 may have a positive bend radius upon installation and a negative bend radius after the brush is worn, or a negative bend radius upon installation and a positive bend radius after the brush is worn, or the bend sensor may be substantially aligned along a plane at initial installation or after a particular amount of wear to the brush 24. In some cases, two or more flexible sensors 60 may be used for monitoring the wear states of the brush 24 and/or the rotating component 15. The two or more flexible sensors 60 may be positioned adjacent to different portions of the spring, such that a first flexible sensor 60 may be used to monitor the wear state of the brush 24 and/or the rotating component 15 over a first duration of time and a second flexible sensor 60 may be used to monitor the wear state of the brush 24 and/or the rotating component 15 over a second duration of time. The first and second durations of time may overlap in some instances. In an illustrative example, the first flexible sensor 60 may be at least partially bent (e.g., positioned near the coil of the spring 29) and the second flexible sensor 60 may be significantly straight (e.g., positioned near the lower beam member 28), such that the wear state monitor 50 may be configured to primarily or solely use information from the first flexible sensor 60 during a duration of time after installation of the brush assembly 110 on the machine, a combination of information received from both the first and second flexible sensors during a second duration of time during normal operation, and information received primarily or solely from the second flexible sensor at a third duration of time, such as a duration of time when the brush 24 is approaching a replacement wear state or is otherwise near a replacement wear state. In some cases, a sensor other than a flexible sensor having a variable resistance may be contemplated to obtain information about an amount of wear to the brush 24 and/or an amount of wear to the rotating component 15 in relation to a movement of the spring 29. Obtaining information about an amount of wear to the rotating component 15 includes obtaining information about an amount of wear to the surface 12 of the rotating component 15. In some cases, one or more wires may be positioned adjacent to the spring 24. For example, a portion of one or more wires may be affixed to the spring 24. In some cases, an opening in a portion of an insulating layer around the one or more wires may be present to expose a portion of the wire. In such cases, the exposed and/or un-insulated portion of the wire may contact another surface (e.g., a surface of the spring 29, a surface of the brush 24, or another surface associated with the brush assembly 110), which may cause the wire to conduct electricity and/or stop conducting electricity. In some cases a first wire may be positioned to indicate a known wear state of the brush 24, such as an initial wear state condition, a wear state approaching a replacement wear state condition of the brush 24, and/or a replacement wear state condition of the brush 24. In some cases, a second or additional wire may be positioned to indicate another wear state of the brush 24 different from the first wear state. For example, a first wire may be used to indicate a wear state approaching a replacement wear state, and a second wire may be used to indicate a replacement wear state of the brush 24. In some cases, the wire may be associated with one or more resistors, and/or other electrical components. In such cases, as the wear state of the brush 24 changes, different ones of the one or more electrical components (e.g., transistors, LEDs, resistors, etc.) may be included in an electrical circuit. For example, a first resistance value may be associated with a first particular wear state and a second resistance value may be associated with a second particular wear state. In some cases, the wear state monitor 50 may include a sensor or other device to at least partially identify a vibration or other movement corresponding to a wear state of the rotating component 15. For example, an acceleration and/or a pressure sensor may be associated with the wear state monitor 50 and information received from the acceleration and/or the pressure sensor may be used to identify a characteristic (e.g., a magnitude, a frequency, etc.) of a vibration of the brush 24. The wear state monitor 50 may use this information in addition to or in place of information received from the flexible sensor 60, such as a bend sensor, or other sensor (e.g., a temperature sensor, a humidity sensor, etc.) to determine whether the wear state of the rotating component 15 is approaching a maintenance wear state or has reached a required maintenance wear state.

The wear state monitor 50 may be communicatively coupled to the flexible sensor 60 to receive a signal corresponding to the wear state of at least one of the brush 24 and the rotating component 15. The wear state monitor 50 may be configured to determine the wear state of the brush 24 and/or the rotating component 15 using a comparator by comparing the signal received from the flexible sensor 60 to at least one predetermined threshold. The wear state monitor 50 may provide the determined wear state information about the brush 24 and/or the rotating component 15 to a user via an indicator provided on the wear state monitor 50 and/or a communication circuit capable of communicating to an external device, such as the site monitor 120, via a communication link.

Figure 4:
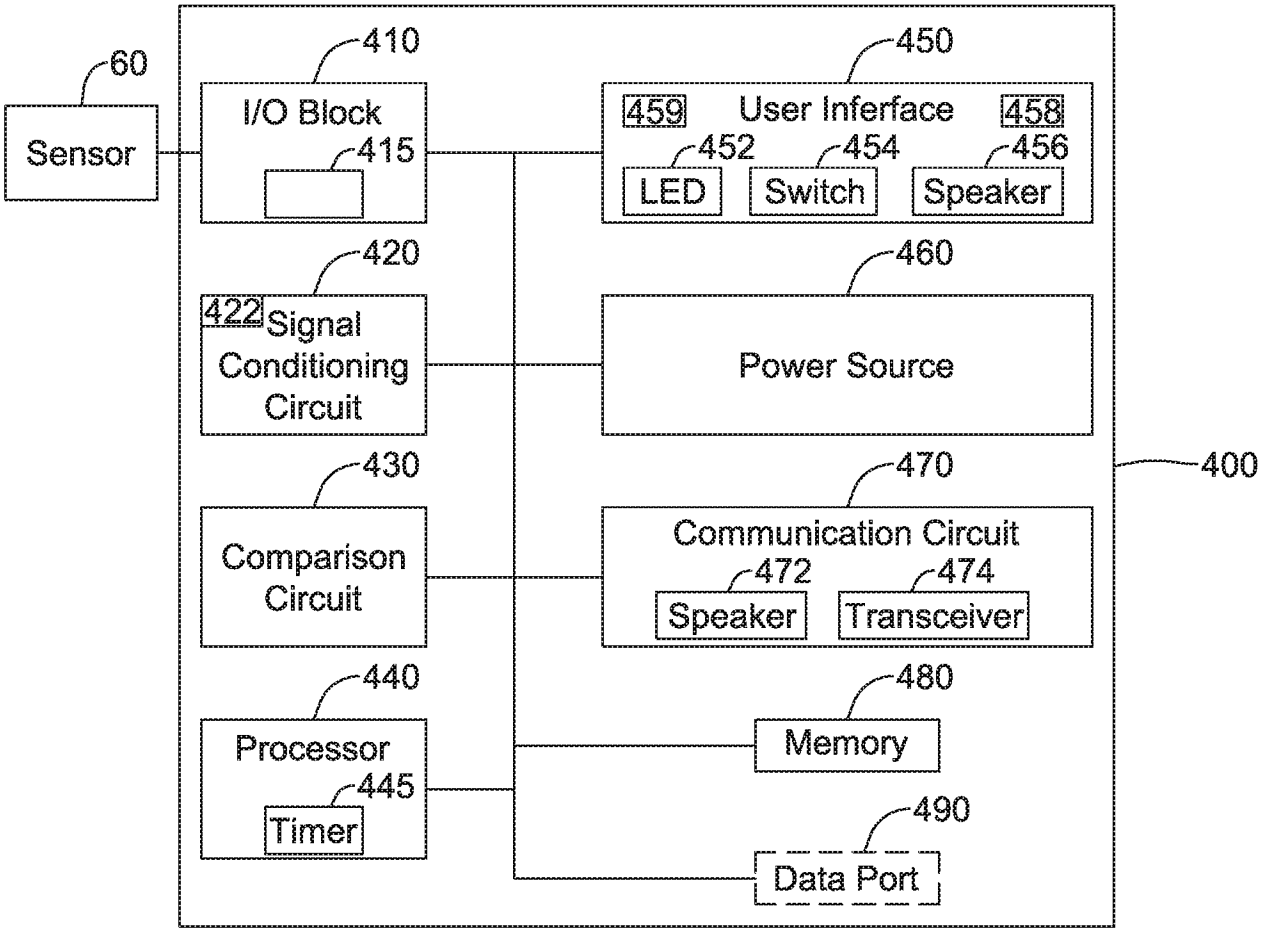
FIG. 4 is a block diagram representation of the illustrative wear state sensor of FIGS. 1-3.

FIG. 4 is a block diagram representation of the illustrative wear state monitor 50 of FIGS. 1-3. In an example, the illustrative wear state monitor 50 may be communicatively coupled to a sensor, such as the flexible sensor 60 to obtain information about the wear state of the brush 24 and/or the rotating component of the electrical machine. In this illustrative embodiment, the wear state monitor 50 may include one or more of an input/output block (I/O block) 410, a signal conditioning circuit 420, a comparison circuit 430 (e.g., a comparator), a processor 440 (e.g. a microprocessor, a microcontroller, etc.), a user interface 450, a communication circuit 470, a memory 480 and/or a data port 490. In some cases, the wear state monitor 50 may include a power source 460, such as a battery, a capacitor, or both. In some cases, the battery may be rechargeable and/or replaceable. In some cases, the wear state monitor 50 may include energy harvesting capability, such that the power source 460 may receive energy and/or may be recharged by one or more energy harvesting technologies. For example, illustrative energy harvesting technologies may include a kinetic (e.g., vibrational) energy harvester (e.g., a piezoelectric vibration energy harvester, a magneto-inductive vibration energy harvester, etc.), a photovoltaic energy harvester capable of harvesting energy indoors and/or outdoors, a piezoelectric energy harvester, a thermal energy harvester, a wind energy (e.g., microturbine) harvester, and/or an ambient radiation (e.g. radio frequency) energy harvester.

In some cases, in addition to or instead of the power source 460, the wear state monitor 50 may include one or more connectors and/or terminals capable of receiving power from a source separate from the wear state monitor 50. In such cases, the wear state monitor 50 may be configured to receive power from an external power source when the brush holder assembly 110 is installed on the electrical machine. For example, an electrical circuit to the wear state monitor 50 may be completed when the brush holder assembly 110 is coupled to the mounting block 70 such that electrical power may pass from a power source through the mounting block 70 to the wear state monitor 50. In such a configuration, electrical power may be automatically provided to the wear state monitor 50 when the brush holder assembly 110 is mounted onto the mounting block 70 of the electrical machine, and electrical power to the wear state monitor 50 may be discontinued when the brush holder assembly 110 is removed from the mounting block 70. In some cases, the I/O block 410 may include one or more connectors 415 (e.g., screw terminals, spring terminals, etc.) for connecting the flexible sensor 60 to the wear state monitor 50. In some cases, the I/O block 410 may be located within the wear state monitor 50 or may be positioned on or near an external surface of the wear state monitor 50. For example, the I/O block 410 may be positioned within a cavity within the wear state monitor 50 and accessible via an opening and/or a removable cover. A signal received from the flexible sensor 60 may be conditioned by the signal conditioning circuit 420.

The signal conditioning circuit 420 may be configured to perform filtering, amplification, buffering, and/or other adjustments to the amplified pressure indicating signal. In some cases, the signal conditioning circuit 420 may include one or more discrete components (e.g., resistors, transistors, capacitors, inductors, diodes, etc.) and/or integrated circuits (e.g., operational amplifiers, buffers, ASICs, etc.). In some cases, the signal conditioning circuit 420 may include one or more filters 422. The filters 422 may be implemented as a combination of integrated or discrete elements, such as a resistor and a capacitor configured as a series RC network (e.g., a low-pass filter). Although a first order low-pass filter may be used, it is contemplated that any combination of analog or digital filters can be used, including one or more high pass filters, low pass filters, band pass filters, notch filters, passive filters (e.g., having "T" sections, "π" sections, etc.), active filters (e.g., Chebyshev filter, Butterworth filter, etc.), IIR filters, FIR filters, and/or any other suitable filter or filter combination.

The signal received from the flexible sensor 60 may then be compared to one or more predetermined thresholds using the comparison circuit 430. In some cases, the threshold for the one or more thresholds may be set using one or more discrete electrical components, such as one or more resistors, capacitors, inductors, diodes, transistors, and/or integrated circuits, such as a comparator and/or a processor. In some cases, the processor 440 may read the threshold from a memory 480 and/or compute the threshold using one or more instructions stored in the memory 480. In some cases, the specified threshold may be fixed at a pre-determined level. In other cases, the specified threshold may be configurable and/or adaptable, as desired. For example, the one or more thresholds may be configurable by a user during a calibration procedure before and/or after the wear state monitor 50 is installed in a brush holder assembly 110. During an illustrative calibration procedure, the user may obtain one or more steady-state values from the flexible sensor 60 after the flexible sensor 60 is installed in the brush holder assembly 110. For example, the obtained values may correspond to a first position of the brush 24, such as an engaged position when the brush 24 has approximately no wear and a second position corresponding to a brush position approximating a position when the brush 24 has a predetermined amount of wear (e.g., approaching the replacement threshold, maximum allowable wear, etc.). Calibration may be important due to one or more mechanical and/or electrical differences between particular brush assemblies. In some cases, a user may communicate a threshold value via a communication interface, such as the communication circuit 470, the user interface 450 (e.g., using one or more switches 454 and/or potentiometers 458), and or the data port 490, such as from an external memory device (e.g., a flash memory device, etc.).

The processor 440 may operate using an algorithm for determining a wear state indication of at least one of the brush 24 and the rotating component 15 and/or communicates one or more indication of the wear state of the brush 24 and/or rotating component 15 to a user. The processor 440 may, for example, operate using an algorithm that causes the wear state monitor 50 to obtain information corresponding to a bend radius of the flexible sensor 60 continuously or at predetermined intervals. In some cases, wear state monitor 50 may include a timer 445 and/or an analog to digital converter (ADC) 447. The timer 445 and/or the ADC 447 may be integral to the processor 440 or may be provided as a separate component. In some cases, one or more components and/or functionality of the signal conditioning circuit 420 and/or the comparison circuit 430 may be incorporated into the instructions processed by the processor 440.

The memory 480 of the illustrative wear state monitor 50 may be in communication with the processor 440. The memory 480 may be used to store any desired information, such as the aforementioned control algorithm, threshold values, schedule times, sampling times, trending information, and the like. The memory 480 may be any suitable type of storage device including, but not limited to, RAM, ROM, EPROM, flash memory, a hard drive, and/or the like. In some cases, the processor 440 may store information within the memory 480, and may subsequently retrieve the stored information.

In the illustrative embodiment of FIG. 4, the user interface 450 may be any suitable user interface that permits the wear state monitor 50 to display and/or solicit information. In some cases, the user interface 450 may accept one or more user interactions with the wear state monitor 50 and/or may permit the wear state monitor 50 to display, or otherwise convey, information about the wear state of the brush 24 and/or the rotating component 15. For example, the user interface 450 may include one or more indicators, such as LEDs 452 or speakers 456, capable of providing the indication of the determined wear states to the user. The LEDs 452 may include one or more LEDs 452 capable of emitting one or more colors, the colors and/or the lack of colors being representative of a corresponding wear state. For example, an unlit LED and/or an LED emitting a green light (optional) may indicate an operational or "good" wear state, an LED emitting a yellow light may indicate a wear state where the associated component may be approaching a replacement wear state, and an LED emitting a red light may indicate a replacement wear state. The listed color choices are merely representative and other colors and/or combinations of colors may be contemplated. In some cases, the user interface 450 may be configured to illuminate a different number of LEDs 452 and/or a pattern of LEDs 452 to indicate one or more particular wear state conditions of the brush 24 and/or the rotating component 15. In some cases, a reflective surface (e.g., the polished brush box of the brush holder 22, a separate reflector, etc.) may be used to direct and/or amplify light emitted by the one or more LEDs.

In some cases, the wear state of the brush 24 and/or rotating component 15 may be indicated by the user interface 450 via the speaker 456. The speaker 456 may be used to emit an audible indication, such as a specified tone for a specified duration, for one or more wear states of the brush 24 and/or the rotating component 15.

In some cases, the user interface 450 may include one or more components to allow a user to input information about the wear state monitor 50 (e.g., a communication address, an installed location, etc.), information about the flexible sensor 60 and/or brush holder assembly 110 (e.g., calibration information, threshold information, etc.), or other information about the brush monitoring system 100. For example, the user interface 450 may include one or more switches 454 that may be used to assign a communication address or other identification information, to a particular wear state monitor 50, assign a communication channel and/or frequency for communication via the communication link 115, specifying a monitoring schedule, and/or adjust a threshold by, for example, adding and/or removing a resistor network to adjust a voltage divider network. For example, a user interface 450 may include one or more groups of switches 454, where a first portion of switches 454 may be used to assign a site address, a second portion of the switches 454 may be used to assign an electrical machine number and a third portion of the switches 454 may be used to assign a brush assembly number or identify a location of the brush assembly 110. In some cases, the user interface 450 may include one or more potentiometers and/or variable resistors that may be used to adjust a threshold, such as during a configuration process. These user interface components are merely illustrative and other components may be contemplated.

In some cases, user interface 450 may include a display 458 and one or more buttons 459 for entering information, such as by navigating one or more menu options. The display 458 may be any suitable display. In some instances, a display 458 may include or may be a liquid crystal display (LCD), and in some cases a fixed segment display or a dot matrix LCD display. If desired, user interface 450 may be a touch screen LCD panel that may operate both display 458 and data entry functions. In some instances, the display 458 may be adapted to solicit values for a number of operating parameters and/or to receive such values, but this is not required. In some cases, the user may be capable of entering at least a portion of the identification information (e.g., a site number, a machine number, a brush assembly number) using the touch screen display, the keyboard, the buttons 459 or other means of inputting the numerical and/or textual information In many cases, when a diagnostic limit, such as a predetermined threshold, has been violated, the processor 440 may be configured to indicate to the user that a diagnostic fault has occurred. This may be accomplished in any of a variety of ways. For example, if the processor 440 has determined that a diagnostic limit has been violated, and a diagnostic fault has occurred, the processor 440 may cause a user alert to be indicated by the user interface 450. In some cases, the processor 440 may process instructions to alert the user to a particular wear state only after a predetermined number of threshold violations and/or that a threshold violation exceeds a particular duration are detected by the processor 440. For example, the processor 440 may be programmed to indicate a wear state of the brush 24 after a particular threshold value has been met for at least a predetermined threshold (e.g., 5 seconds, 30 seconds, 1 minute, etc.). Similarly, the processor 440 may be programmed to indicate a wear state of the rotating component 15 after a particular threshold (e.g., a replacement threshold) has been exceeded for a specified number of times (e.g., ten times, fifteen times, etc.) within a particular duration (e.g., 30 seconds, 1 minute, etc.) and/or a specified number of revolutions of the rotating component (e.g., 10 revolutions, 20 revolutions, etc.). In some cases, the user alert may be an audible tone from the speaker 456 and/or a simple text string displayed on a display of the user interface 450 which may describe the nature of the violation that has occurred. In other instances, the processor 440 may provide some visual indication to alert the user that a fault has occurred. Such visual indication may include a colored, flashing or otherwise visible indication provided on the user interface 450. In still other instances, the processor 440 may be configured to provide information to another device, such as the site monitor 120 or the remote monitoring device 150, 160. One or more of the site monitor 120 or the remote monitoring device 150, 160 may provide the information to a user via a visual indication, an audible indication, an email, an instant message, a text message or some other message to a user to alert the user of the wear state of the one or more components of the brush holder assembly 110. Such information may be provided via an internet gateway 170 or other device that is adapted to communicate over the internet or other wide area network, a local area network, and the like. For example, the internet gateway 170 may be configured to communicate with the network 130, and/or an industrial control system. Such an alert may be provided to the user even when the user is away from the site in which the brush monitoring system 100 is located.

In addition to the user interface 450, the wear state monitor 50 may be capable of communicating information about the wear state of the brush 24 and/or the rotating component 15 to a user via the communication circuit 470. The information about the wear state of the brush 24 and/or the rotating component 15 may be associated with information identifying one or more of a particular site, a particular electrical machine and/or a particular brush assembly associated with the brush 24 and/or the rotating component 15. In some cases, the communication circuit 470 may include a communication port (e.g., a speaker 472, a transceiver 474, etc.) that may be used to communicate with the site monitor 120 via the communication link 115. One or more communication protocols may be used by the wear state monitor 50 to communicate wear state information associated with the brush holder assembly 110 to the site monitor 120. The communication circuit 470 may include a chipset capable of communicating via one or more communication link technologies such as by using audio energy (e.g. an ultrasonic signal), radio frequency (RF) energy (e.g., an RF signal), and/or light energy (e.g., an optical signal, an infrared (IR) signal, etc.), or the like. In some cases, the communication circuit 470 may be capable of communicating via one or more other wireless technologies such as Bluetooth™, Wi-Fi, Zigbee or any other wireless protocol. In some cases, the communication circuit 470 may be configured to communicate via one or more wired interfaces, but this is not required. For example, the communication circuit 470 may include a wired port such as a serial port, an ARCNET port, a parallel port, a serial port, a CATS port, a USB (universal serial bus) port, and/or the like. In some cases, the communication circuit 470 may use one or more communication protocols, such as Ethernet, BACNet, LONtalk, DeviceNet, ControlNet, Profibus, etc., that may be used via a wired network or a wireless network.

In some cases, as illustrated in FIG. 4, the wear state monitor 50 may optionally include a data port 490. Data port 490 may be a wireless port such as a Bluetooth™ port or any other wireless protocol. In other cases, data port 490 may be a wired port such as a serial port, a parallel port, a CATS port, a USB (universal serial bus) port, and/or the like. In some instances, data port 490 may be a USB port and may be used to download and/or upload information from a USB flash drive or some other data source. Other remote devices may also be employed, as desired. The data port 490 may be configured to communicate with processor 440 and may, if desired, be used to upload information to processor 440 and/or download information from the processor 440. Information that can be uploaded and/or downloaded may include, for example, values of thresholds and/or timing information. In some instances, the data port 490 may be used to upload previously-created configuration information of the wear state monitor 50 and/or the flexible sensor 60, thereby hastening the configuration process. In some cases, data port 490 may be used to download a configuration that has been created using a particular wear state monitor 50 and/or flexible sensor 60 so that the configuration may be transferred to other similar wear state monitors 50, hastening their programming process. In some cases, the data port 490 may be used to upload and/or download information pertaining to wear state trends of the brush 24 and/or the rotating component 15, if desired.

In some cases, data port 490 may be used to download data stored within the memory 480 for analysis. For example, data port 490 may be used to download a wear state log associated with the brush 24 and/or the rotating component or parts thereof to a removable device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XML, and/or Adobe PDF® file, but this is certainly not required.

In some cases, the wear state monitor 50 may include one or more environmental sensors capable of sensing characteristics of the environment near the brush holder assembly 110. Examples of the environmental sensors may include a temperature sensor and/or a humidity sensor. The wear state monitor 50 may be configured to use the sensed environmental information when determining a threshold and/or may communicate the sensed environmental information to another device, such as the site monitor 120 or the remote monitoring device 150, 160.

Figure 5A:
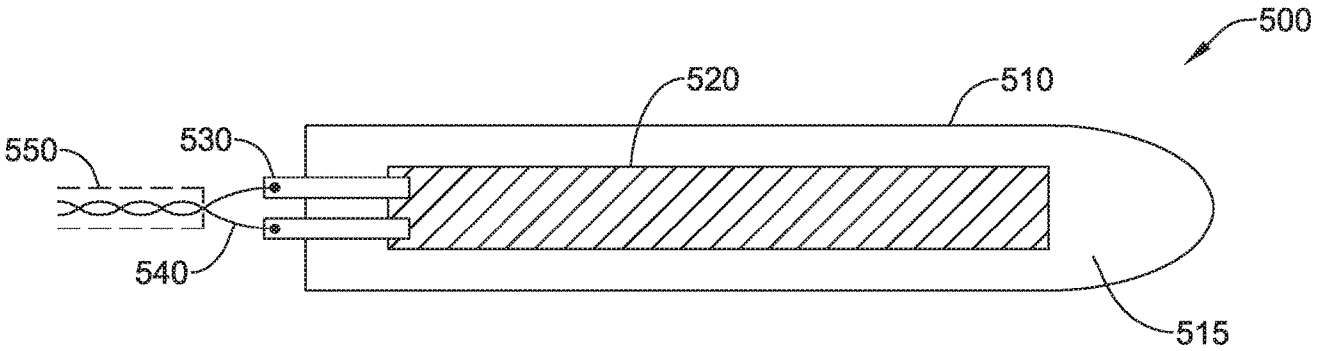
FIGS. 5A and 5B are perspective views of an illustrative flexible sensor.
Figure 5B:
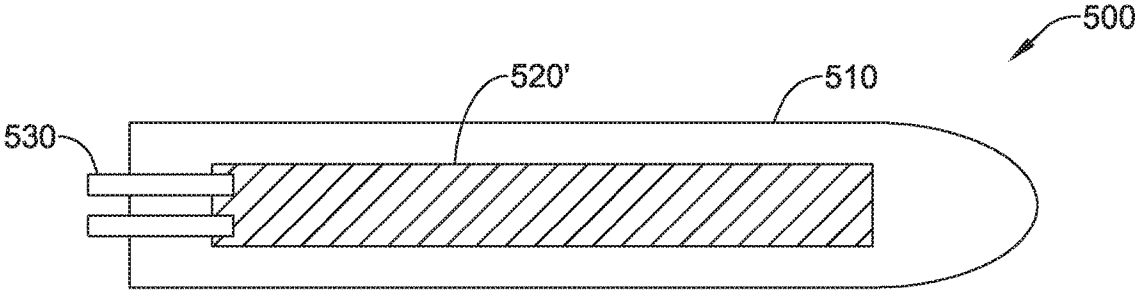

FIGS. 5A and 5B are perspective views of an illustrative flexible sensor 60 of FIGS. 1, 3, and 4. The illustrative flexible sensor 60 may include a substrate 510, at least one ink layer 520, and two or more electrical connectors 530 that may be connected to one or more wires 540. The flexible sensor 60 may be substantially flat and may be selected from a variety of lengths, widths and/or thicknesses. In some cases, the flexible sensor 60 may have a variable resistance that is designed to change as the flexible sensor 60 is bent. The flexible sensor 60 may be formed by depositing the one or more electrically conductive ink layers 520 onto a top surface 515 of the substrate 510. For example, the substrate 510 may be formed from a flexible, electrically insulating material, such as a plastic film (e.g., a biaxially-oriented polyethylene terephthalate film, a polyimide film, a polyester film, a polyamide film, a phenolic resin etc.). The electrically conductive ink layers 520 may be adhered to the top surface 515 of the substrate 510 and may be formed from one or more electrically conductive inks (e.g., a carbon-based ink, a polymer based ink, a composite ink, and the like) and/or one or more other electrically conductive materials, such as an epoxy and/or an adhesive where the epoxy or adhesive includes a conductive material (e.g., graphite, carbon, etc.). In some cases, the electrically conductive ink layers 520 may be capable of forming micro-cracks as the substrate 510 is bent, where the size and or shape of the micro-cracks causes the electrical resistance of the flexible sensor 60 to change in a predictable manner. Examples of such a flexible sensor 60 may include the Bend Sensor® from Flexpoint Sensor Systems, Inc. of Draper Utah. Other examples of flexible sensors are disclosed in U.S. Pat. Nos. 7,248,142; 8,047,083; 7,277,004; and 5,157,372; each of which is incorporated herein by reference.

As discussed above, the flexible sensor 60 may have a variable resistance that is designed to change as the flexible sensor 60 is bent. The flexible sensor 60 may be connected to a wear state monitor 50 by an electrical connection, such as one or more terminals 530, wires 540 or other such means to form an electrical connection. In some cases, the wires 540 may be shielded to reduce an amount electrical noise introduced into the circuitry of the wear state monitor 50 from the brush monitoring system 100. For example, the wires 540 may be a twisted pair of wires 540 included in a cable having a shield 550. In some cases, such as in FIG. 5B, the electrical connectors 530 may be connected directly to one or more terminals 425 of the wear state monitor 50.

The power source 460 (e.g., a battery) of the wear state monitor 50 may be used to supply power to one or more components of the wear state monitor 50 and/or the flexible sensor 60 to facilitate generation of a signal representative of a bending radius of the flexible sensor 60. For example, the wear state monitor 50 and the flexible sensor 60 may operate together to form at least a portion of a voltage divider circuit to produce a voltage output that is a fraction of a power source voltage. By bending the flexible sensor 60 using a bending force, such as the force provided by the spring 29 to maintain physical contact between the brush 24 and the surface of the rotating component 15, the bending force may cause a change in resistance of the flexible sensor 60. The change in the resistance of the flexible sensor 60 may correspond to the physical position of a top surface 624 of the brush 24 in relation to the conductive surface 12 of the rotating component 15. The variable resistance of the flexible sensor 60 may vary linearly or non-linearly corresponding to a degree of bending of the flexible sensor 60. Similarly, the change in resistance of the flexible sensor 60 causes a corresponding change in the voltage output of the signal representative of the bend radius of the flexible sensor 60.

Information about the bend radius of the flexible sensor 60 may be used to determine a wear state of the brush 24 and/or the condition of a rotating component 15 of the electrical machine (e.g., a slip ring). As mentioned above, the wear state monitor 50 may be electrically connected to the flexible sensor 60 by the wires 540. The wear state monitor 50 may determine a wear state of the brush 24 and/or the rotating component 15 by comparing at least a portion of the signal representative of the bend radius of the flexible sensor 60 to one or more predetermined threshold values. In some cases, the wear state monitor 50 may be configured to include a first threshold value corresponding to a first wear state of the brush 24 and a second threshold value different from the first threshold value corresponding to a second wear state of the brush 24. For example, the first threshold value may be a first voltage level associated with a brush wear state indicative of a wear state where the brush 24 should be replaced within a predetermined time period (e.g., within a week). The second threshold value may correspond to a wear state of the brush 24 indicative of a wear state requiring the brush 24 to be replaced as soon as possible.

In some cases, the wear state monitor 50 may be configured to monitor a vibration of the brush 24. For example, a vibration of a brush 24 may be due to one or more imperfections or other deformation of the rotating component 15 of the electrical machine. For example, a slip ring may deform or may wear unevenly to cause one or more portions of the slip ring to be out of round. As the brush 24 encounters these defects at one or more positions during a revolution of the rotating component 15, the defects may cause the brush 24 to vibrate at a rate corresponding to the rotation speed and/or the number of defects at the conductive surface 12 of the rotating component 15 (e.g., a slip ring, a commutator, etc.). In some cases, the wear state monitor 50 may be configured to include a third threshold value, different than the first and second threshold values, corresponding to a first wear condition of the rotating component 15 of the electrical machine and a fourth threshold value, different than the first, second and third threshold values, corresponding to a second wear condition of the rotating component 15. For example, the third threshold value may be a first voltage level associated with a condition of the rotating component 15 indicative of a wear state where the rotating component 15 should be replaced and/or repaired within a predetermined time period (e.g., within a week). The fourth threshold value may correspond to a condition of the rotating component 15 indicative of a condition where maintenance (e.g., replacement and/or repair) of the rotating component 15 should be completed as soon as possible.

Figure 6A:
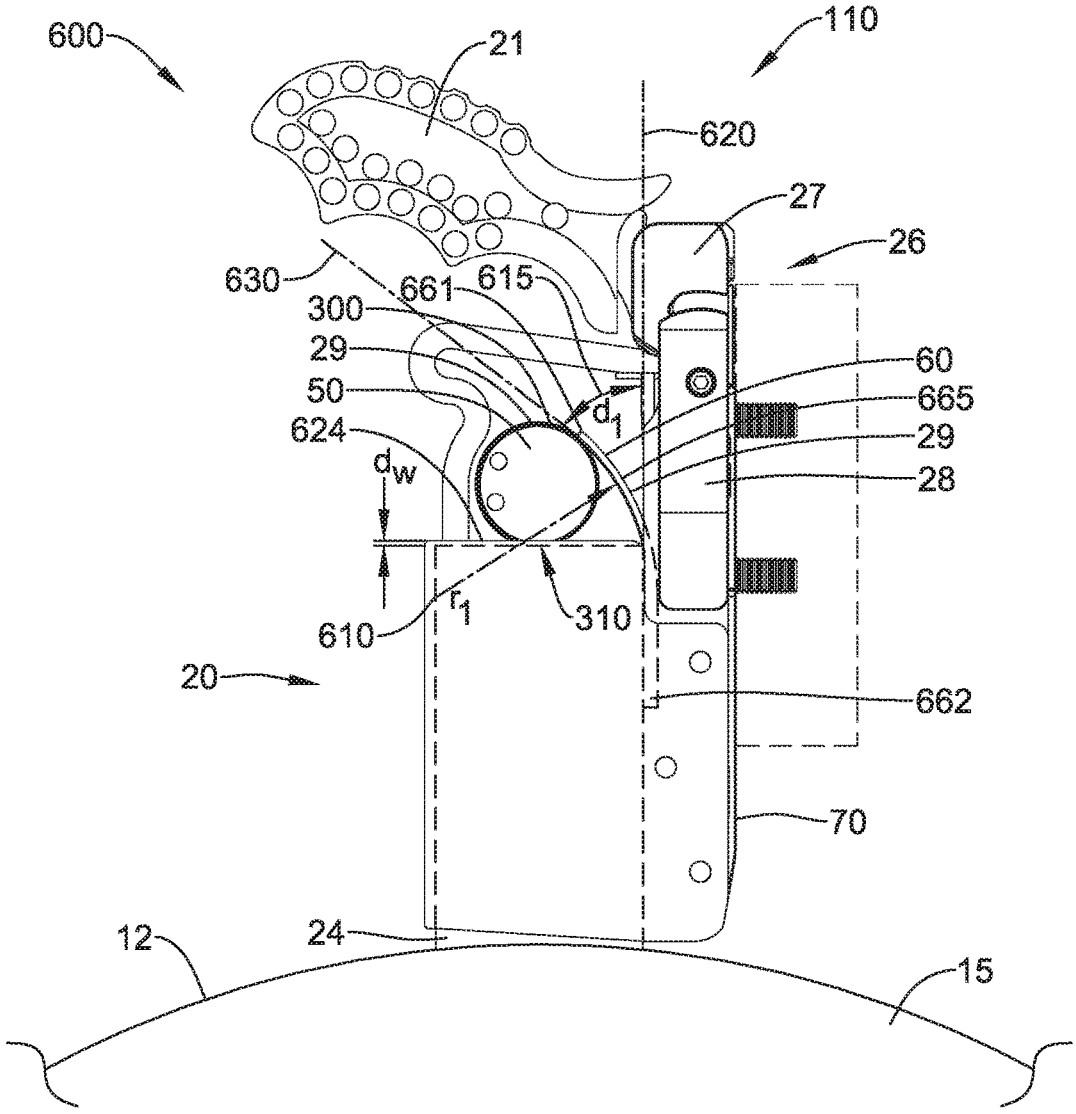
FIGS. 6A and 6B show side views of an illustrative brush holder assembly having a particular wear state of a carbon brush.
Figure 6B:
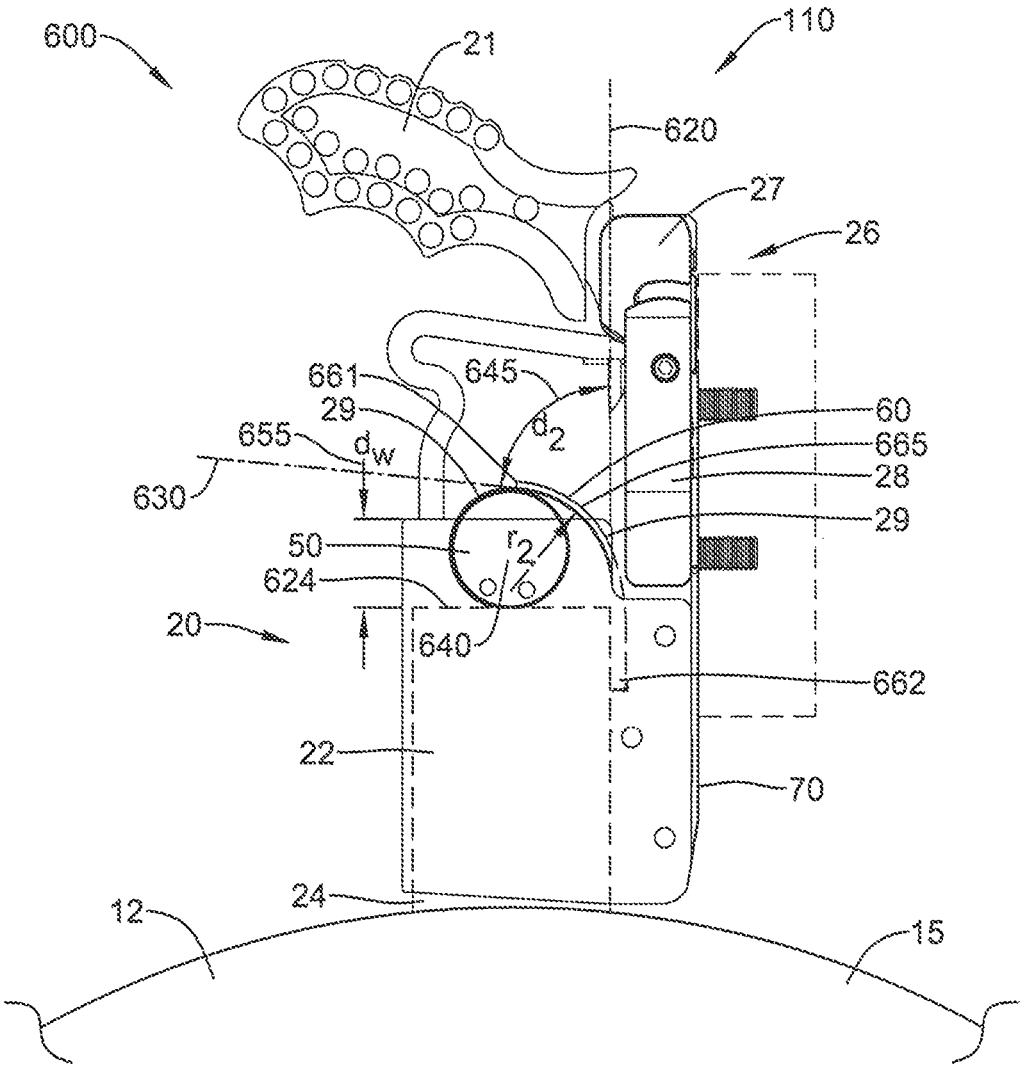

FIGS. 6A and 6B show perspective views of an illustrative brush holder assembly 600, such as the brush holder assembly 110 of FIG. 1, at different identifiable wear states of the brush 24. The wear state monitor 50 may be positioned within the coil 310 of the spring 29. The flexible sensor 60 may be positioned adjacent to the spring 29 and electrically connected to the wear state monitor 50. Here, this electrical connection is not shown to simplify the illustration. FIG. 6A illustrates a first wear state of the brush 24, such as an initial wear state of the brush 24 when the brush holder assembly 600 is first installed on an electrical machine. For example, when the brush holder assembly 600 is in an engaged position, the spring 29 applies a force to the top surface 624 of the brush 24 to engage the brush 24 with the conductive surface 12 of the rotating component 15. The top surface 624 may be at a first position where the bending force of the spring 29 causes a first bend radius 610. The first bend radius 610 may cause the flexible sensor 60 to have a first resistance value that may be associated with the initial wear state of the brush 24. A second bend radius 640 may cause the flexible sensor 60 to have a second different resistance value that may be associated with a different wear state of the brush 24, such as a wear state approaching a replacement wear state or a replacement wear state. The brush monitoring system 100 and/or components of the brush monitoring system (e.g., the wear state monitor 50, the site monitor 120, the remote monitoring devices 150, 160) may be calibrated to account for variations in geometry of the brush holder assembly and/or the brush, the differing forces applied by different springs, and/or for other factors that may change between different brush holder assemblies 110. In some cases, the wear state monitor 50 may be resiliently mounted within the coil of the brush 24, such that vibrations of the brush 24 may be absorbed and/or dampened.

The resistance value of the flexible sensor 60 at the different bend radiuses may be caused by a series of micro-cracks 665 formed within the ink layer 520 that may form as the flexible sensor 60 bends. The micro-cracks 665 may form due to cracking of a brittle component of the ink layer 520, while a flexible component may maintain the overall integrity of the ink layer 520. The micro-cracks 665 in the ink layer 520 cause the electrical resistance of the flexible sensor 60 to change. As a bend radius decreases due to the applied bending force, more micro-cracks 665 form in the ink layer 520 causing the resistance of the flexible sensor 60 to increase. The resistance can vary based on the magnitude of bending force applied to the flexible sensor 60, the amount of wear of the brush 24 and/or the movement of the brush 24. The wear state monitor 50 may receive a variable voltage signal from the flexible sensor 60 based on the variable resistance of the flexible sensor 60 due to movement over a duration of interest. A smaller radius of curvature may correspond to a larger resistance value of the flexible sensor 60. For example, the electrical resistance of the flexible sensor 60 at the first bend radius 610 is less than the electrical resistance of the flexible sensor 60 at the second bend radius 640. The flexible sensor 60 may be repeatedly bent because the ink layer 520 continues to have a strong bond to the substrate 510. The resistance of the flexible sensor 60 returns to the first resistance value when the flexible sensor 60 returns to the first bend radius 610.

The flexible sensor 60 may be installed within the brush holder assembly 110 such that a proximal end 661 including the electrical connections, such as terminals 530, may be oriented toward the wear state monitor 50 and a distal end 661 may be oriented away from the wear state monitor 50. In the example of FIG. 6A, at the initial wear state of the brush 24, at least a portion of the flexible sensor 60 including the distal end is oriented along a first plane 620 and another portion of the flexible sensor including the proximal end is oriented along a second plane 630, where the deflection 615 between the first plane 620 and the second plane 630 corresponds to the first bend radius 610. In FIG. 6B, the brush 24 is shown at a second wear state such that the top surface 624 is at a different second position 651 at a deflection distance 655 from the initial wear state position 605. At this second position 651, at least a portion of the flexible sensor 60 including the distal end 661 is now oriented along a third plane 650 and another portion of the flexible sensor 60 including the proximal end 662 is oriented along a third plane 650, where the deflection 645 between the third plane 650 and the second plane 630 corresponds to the second bend radius 640.

Figure 7:
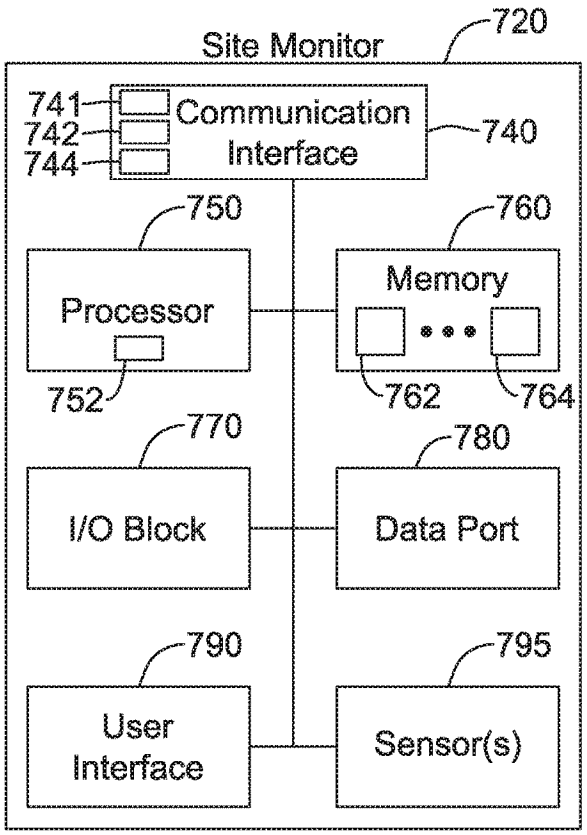
FIG. 7 is a block diagram representation having an illustrative site monitor.
Figure 7:
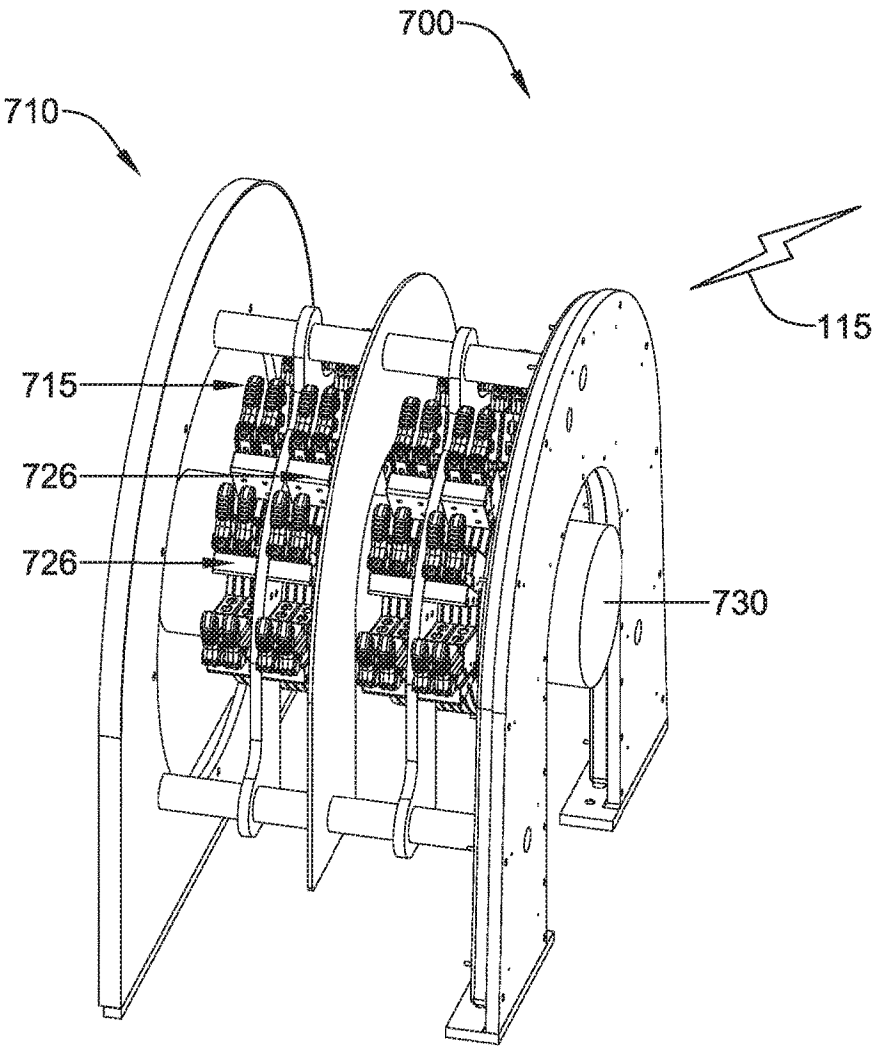

FIG. 7 is a block diagram representation of a brush monitoring system 700 having an illustrative site monitor 720, such as the site monitor 120. At a facility, one or more electrical machines 710 may be configured to include one or more brush holder assemblies 715, such as the brush holder assembly 110. The brush holder assemblies 715 may be positioned around a rotating portion 730 (e.g. a shaft) of an electrical machine (e.g., a motor, a generator, etc.). The brush holder assemblies 715 may be positioned such that a brush 24 contacts a surface of a rotating component (e.g., a slip ring, a commutator) associated with the rotating portion 730 of the electrical machine. In some cases, the brush holder assemblies 715 may be mounted to a portion of the electrical machine using one or more adapters 726 that include the mounting beam 26 of FIGS. 1 and 3. Each of the brush holder assemblies 715 may be configured to communicate to the site monitor 720 via a communication link 115.

The site monitor 720 may include a communication circuit 740, a processor 750, a memory 760, an I/O block 770, a data port 780, a user interface 790, and/or one or more sensors 795. In some cases, the communication circuit 740 may include a signal conditioning circuit 741 that may be used to filter and/or otherwise condition the signal received from the one or more brush holder assemblies 715. The site monitor 720 may include a power source 792, such as a battery, a capacitor, and/or a power line adapter. In some cases, the battery may be rechargeable and/or replaceable. In some cases, the site monitor 720 may include an energy harvesting capability, such that the power source 792 may receive energy and/or may be recharged by one or more energy harvesting technologies. For example, illustrative energy harvesting technologies may include a kinetic (e.g., vibrational) energy harvester (e.g., a piezoelectric vibration energy harvester, a magneto-inductive vibration energy harvester, etc.), a photovoltaic energy harvester capable of harvesting energy indoors and/or outdoors, a piezoelectric energy harvester, a thermal energy harvester, a wind energy (e.g., microturbine) harvester, and/or an ambient radiation (e.g. radio frequency) energy harvester.

The communication circuit 740 may be capable of receiving information about the wear state of the brush 24 and/or the rotating component (e.g. a slip ring, a commutator, etc.) associated with the rotating portion 730 of the electrical machine from one or more wear state monitors (e.g., the wear state monitor 50) associated with the brush holder assemblies 715 and/or communicating configuration and/or timing information to the one or more wear state monitors 50. In some cases, the communication circuit 740 may include a communication port (e.g., an audio receiver/transmitter 742, an RF transceiver 744, etc.) that may be used to communicate with the wear state monitor 50 via the communication link 115. One or more communication protocols may be used for communication between the wear state monitors 50 of the brush holder assemblies 715 and the site monitor 720. The communication circuit 740 may include a chipset capable of communicating via one or more communication link technologies such as by using audio energy (e.g. an ultrasonic signal), radio frequency (RF) energy (e.g., an RF signal), and/or light energy (e.g., an optical signal, an infrared (IR) signal, etc.), or the like. In some cases, the communication circuit 740 may be capable of communicating via one or more other wireless technologies such as Bluetooth™, Wi-Fi, Zigbee or any other wireless protocol. In some cases, the communication circuit 740 may be configured to communicate via one or more wired interfaces, but this is not required. For example, the communication circuit 740 may include a wired port such as a serial port, an ARCNET port, a parallel port, a serial port, a CATS port, a USB (universal serial bus) port, and/or the like. In some cases, the communication circuit 740 may use one or more communication protocols, such as Ethernet, BACNet, LONtalk, DeviceNet, Profibus, ControlNet, etc., that may be used via a wired network or a wireless network. For example, the communication circuit 740 may be configured to communicate via one or more communication links 125, 127, 135, and 137, such as via the network 130, to a remote monitoring device 150, 160 at a remote site at a different geographical location than the site monitor 720, such as the remote monitoring site 140. In some cases, the communication circuit 740 may be configured to communicate to an industrial controller (e.g., a programmable logic controller) to provide wear state information about one or more brush assemblies 715 to a user.

In some cases, each of the one or more brush assemblies 715 may be assigned a unique identifier, such as a communication address, to facilitate communication with one or more of the site monitor 720 and the remote monitoring device 150, 160. Each unique identifier may allow the site monitor 720 and/or the remote monitoring device 150, 160 to associate received wear state information with a particular brush assembly and/or portion of the rotating component 15 of a particular electrical machine. These identifiers may use one or more naming conventions, as desired by a user. For example, the identifier may use an alphanumerical naming convention (e.g., brushassembly14, em1.ba10, machine1.row1.colum3, sitea.machine1.ba3, etc.), a numerical naming convention (e.g., 1,2, 1.2.4, etc.), or an encoded naming convention (e.g., 0x0145CDEF, 11000, etc.).

In some cases, the identifiers may be used to identify a particular brush assembly individually, (e.g., brushassembly24, 24, 0x18, 11000, etc.). The identifiers may also be used to associate the particular brush assembly with a particular electrical machine and/or a particular site (e.g., site1_machine3_brushassembly12, 1.3.12, 0x0111000C, 01 11 00001100, etc.). The wear state monitor 50 may be configured to store the identifier as a character string or as a numerically encoded value. For example, an alphanumerical identifier using an alphanumerical naming convention may be stored and/or communicated as a character string. Identifiers using a numerical naming convention or an encoded naming convention may be stored as one or more numbers (e.g., integers, etc.) that may be communicated as one or more integer values. In some cases, the identifier may be encoded into a single integer value (e.g., a hexadecimal encoded value, a binary encoded value, etc.). By using an encoded naming convention, the identification information may be communicated as, for example, an integer value to minimize communication time. By minimizing communication time, energy usage may be reduced to extend the usable lifetime of the power source 460 of the wear state monitor, the power source 792 of the site monitor, or both.

Identification information may be encoded and stored in and/or transferred to a memory device such as, but not limited to, RAM, EPROM, EEPROM, flash memory, a hard drive, and/or the like. As an example, a 16-bit word may be used to encode identification information, such that a first portion of the 16-bit word (e.g., the four most significant bits, such as 0xSSSS_mmmmbbbbbbbb) may be used to identify a particular site, a second portion of the 16-bit word may be used to identify a particular electrical machine at the particular site (e.g., 0xssss_MMMM_bbbbbbbb), and a third portion of the 16-bit word may be used to identify a particular brush assembly 715 associated with the particular electrical machine (e.g., 0xssss_mmmm_BBBBBBBB). In this illustrative example, the brush monitoring system 700 may include up to sixteen sites that may be numbered between 0 and 15 (e.g., 0x0 to 0xF in hexadecimal, 0000 to 1111 in binary, etc.), up to sixteen electrical machines (e.g., numbered between 0 and 15, between 0x0 and 0xF in hexadecimal, between 0000 and 1111 in binary, etc.) associated to each site, and up to two hundred and fifty six brush assemblies 715 (e.g., numbered between 0 and 255, between 0x00 and 0xFF in hexadecimal, between 00000000 and 11111111 in binary) associated with each of the each of the electrical machines. For example, a particular brush assembly 715 may be assigned an identifier of 0x3A04, which may be decoded by the site monitor 720 and/or the remote monitoring device 150, 160 as the fourth brush assembly 715 on the tenth electrical machine at the third site. These naming conventions are merely illustrative and other such naming conventions may be used and/or contemplated for any particular user site and/or installation.

The site monitor 720 may include the user interface 790 for communicating with a user. For example, the user interface 790 may be any suitable user interface that permits the site monitor 720 to display and/or solicit information, as well as accept one or more user interactions with the site monitor 720. For example, the user interface 790 may permit a user to enter data such as threshold values associated with particular wear states, time interval values, diagnostic limits, conditions under which diagnostic limits may be suspended, responses to alerts, and the like. In some cases, the user interface 790 may allow a user to enter information to facilitate the use of environmental data by the site monitor and/or the wear state monitors, such as temperature set points, humidity set points, and the like. These are just some examples.

The user interface 790 may provide diagnostic information about the machine, including the wear state information about brushes of the one or more brush holder assemblies 715 and/or the rotating components of the electrical machine, to a user via a visual indication, an audible indication, an email, an instant message, a text message or some other message to a user to alert the user of the wear state of the one or more components of the brush holder assembly 715. Such information may be provided via an internet gateway 170 or other device that is adapted to communicate over the internet or other wide area network, such as the network 130. Such an alert may be provided to the user even when the user is away from the site in which the brush monitoring system 100 is located, such as to the remote monitoring device 150, 160 at the remote monitoring site 140. In some cases, the user interface 790 may include a display and a distinct keypad. A display may be any suitable display. In some instances, a display may include or may be a liquid crystal display (LCD), and in some cases a fixed segment display or a dot matrix LCD display. If desired, user interface 790 may be a touch screen LCD panel that functions as both display and keypad. In some instances, a touch screen LCD panel may be adapted to solicit values for a number of operating parameters and/or to receive such values, but this is not required. In some cases, the I/O block 770 of the site monitor 720 may include an interface for connecting one or more user interface devices, such as an external display, a keyboard, a pointing device (e.g., a mouse, a trackball, etc.).

In some cases, the processor 750 may be configured to process wear state information about a rotating component of the electrical machine 710 received from the wear state monitors associated with the one or more brush holder assemblies 715. For example, the processor 750 may operate using an algorithm for processing wear state information received from the brush assemblies 715 to monitor the wear state information of the one or more brushes and/or the rotating component 15 associated with the rotating portion 730 of the electrical machine. For example, the processor 750 may be capable of predicting a usable lifetime remaining for each brush 24 by monitoring the received information over time. In some cases, the processor 750 may process instructions to store the received wear state information into the memory 760. For example, each of the one or more brush holder assemblies 710 may be associated with a particular memory block 762, 764 for storing information about the particular brush holder assembly 715.

The processor 750 may use the stored wear state information, along with any new wear state information, to determine diagnostic information about the electrical machine 710. For example, trend information and/or environmental information received from the brush holder assemblies 715 may be used to determine whether one or more of the brush holder assemblies 715, the rotating component 15 and/or the rotating portion 730 may be misaligned, with respect to one or more of the other components of the electrical machine. In some cases, the site monitor 720 may include one or more sensors 795, such as environmental sensors (e.g., a temperature sensor, a humidity sensor, etc.), and/or an I/O block 770 that may include one or more wire terminals for receiving information from one or more environmental sensors to provide environmental information (e.g., a temperature, a humidity, etc.) about the environment at the site. Such information may be helpful in determining trends and/or performing other diagnostic analysis on the electrical machine.

The processor 750 may be programmed to receive wear state information from the one or more brush holder assemblies 715 at predetermined intervals. In some cases, the predetermined intervals may be fixed at a particular value (e.g., once per day, once per week, etc.) and in other cases, the intervals may change after a particular wear state has been reached. For example, the processor 750 may be configured to receive wear state information from the brush holder assemblies 715 at a first time interval, such as once per day, until one or more brushes and/or the rotating component 15 reach a wear state approaching the replacement wear state. At that point, the processor 750 may sample the wear state information from the brush holder assemblies 715 at a second shorter time interval, such as hourly. In some cases, the processor 750 may include a timer 752 and/or may be communicatively coupled to a timer circuit.

In some cases, the site monitor 720 may receive information about the flexible sensors 60 included in the one or more brush holder assemblies 715. For example, the wear state monitors of the brush holder assemblies 715 may not include processing capability to determine a wear state indication of the brush 24 and/or the rotating component 15. As such, the processor 750 of the site monitor 720 may be programmed to determine a wear state of at least one of the brush 24 and the rotating component 15 using information received from one or more flexible sensors 60 of the brush holder assemblies 715. The processor 750 may, for example, operate using an algorithm that causes the communication circuit 740 to obtain information corresponding to a bend radius of the flexible sensor 60 of a particular brush holder assembly 715 continuously or at predetermined intervals. The processor 750 may then compare the received information to one or more predetermined threshold values to determine a wear state indication for the brush 24 and/or the rotating component 15.

The memory 760 of the illustrative site monitor 720 may be in communication with the processor 750. The memory 760 may be used to store any desired information, such as the aforementioned control algorithm, threshold values, schedule times, sampling times, trending information, and the like. As mentioned above, each of the one or more brush holder assemblies 715 may be associated with a particular memory block 762, 764 for storing information about the particular brush holder assembly 715. The memory 760 may be any suitable type of storage device including, but not limited to, RAM, EPROM, EEPROM, flash memory, a hard drive, and/or the like. In some cases, the processor 750 may store information within the memory 760, and may subsequently retrieve the stored information.

In some cases, the site monitor 720 may optionally include a data port 780. The data port 780 may be a wireless port such as a Bluetooth™ port or any other wireless protocol. In other cases, data port 780 may be a wired port such as a serial port, a parallel port, a CATS port, a USB (universal serial bus) port, and/or the like. In some instances, data port 780 may be a USB port and may be used to download and/or upload information from a USB flash drive or some other data source. Other remote devices may also be employed, as desired. The data port 780 may be configured to communicate with processor 750 and may, if desired, be used to upload information to processor 750 and/or download information from the processor 750. Information that can be uploaded and/or downloaded may include, for example, values of thresholds and/or timing information. In some instances, the data port 780 may be used to upload previously-created configuration information of a particular electrical machine 710 and/or a particular brush holder assembly 715, such as the wear state monitor 50 and/or the flexible sensor 60, thereby hastening the configuration process. In some cases, data port 780 may be used to download a configuration that has been created using a particular wear state monitor 50 and/or flexible sensor 60 so that the configuration may be transferred to other similar wear state monitors 50, hastening their programming process. In some cases, the data port 780 may be used to upload and/or download information pertaining to wear state trends of the brush 24 and/or the rotating component 15, if desired.

In some cases, data port 780 may be used to download data stored within the memory 760 for analysis. For example, data port 780 may be used to download a wear state log associated with one or more brushes and/or rotating components to a removable device such as a USB memory stick (also sometimes referred to as a thumb drive or jump drive), personal computer, laptop, iPAD® or other tablet computer, PDA, smart phone, or other remote device, as desired. In some cases, the data may be convertible to an MS EXCEL®, MS WORD®, text, XML, and/or Adobe PDF® file, but this is certainly not required.

Figure 8:
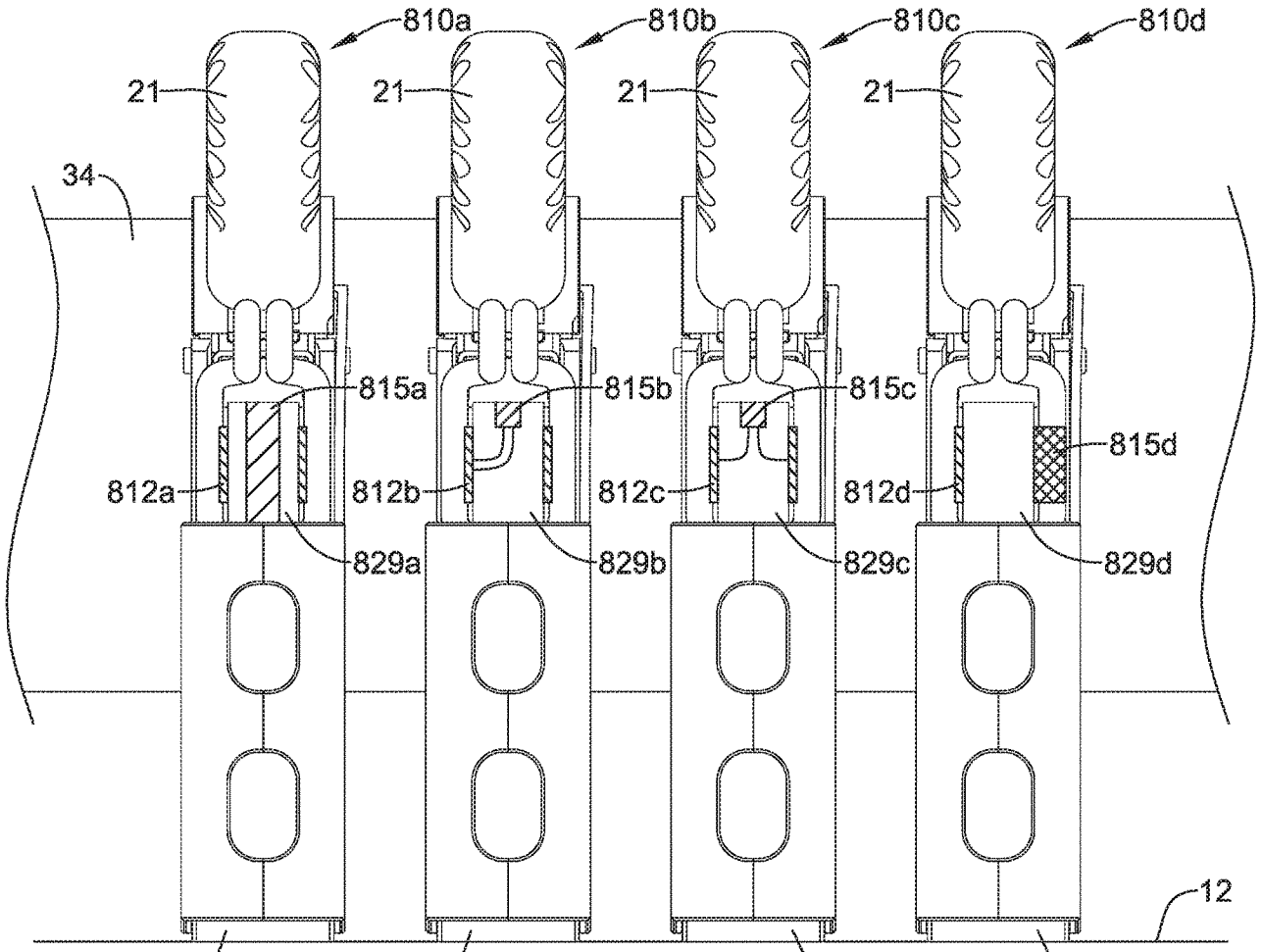
FIG. 8 illustrates an exemplary bus of mounting blocks and brush holder assemblies of an electrical machine utilizing a unique identification system to reference a position of a brush holder and associated brush on the electrical machine.

FIG. 8 illustrates an exemplary bus of mounting blocks and brush holder assemblies 810a-d of an electrical machine utilizing different configurations of the wear state monitor 812a-d and the flexible sensor 815a-d. In some cases, one or more brush holder assemblies 810a-d may be mounted onto the electrical machine by mounting the brush holder assemblies 810a-d on mounting blocks secured to a stationary member 34. For example, a first brush holder assembly 810a may be mounted onto a first mounting block, a second brush holder assembly 810b may be mounted onto a second mounting block, a third brush holder assembly 810c may be mounted onto a third mounting block, and a fourth brush holder assembly 810d may be mounted onto a fourth mounting block, etc.

When the brush holder assemblies 810a-d are moved to the engaged position (such as shown in FIGS. 3, 5A, and 5B) in which the electrical connection is established through the brush 824a-d, a terminal and a mounting block to/from the conductive surface 12, the wear state monitors 812a-d may be positioned in an initial wear state position. At some later point in time, after the brush holder assembly 810a-d has been installed on the electrical device and used, such as when a brush 824a-d has worn sufficiently to warrant replacement, when an anomaly or threshold condition has occurred, or otherwise when maintenance needs to be performed on the electrical device, the brush holder assembly 810a-d and/or the brush 824a-d of the brush holder assembly 810a-d may be removed from the mounting block and replaced with a new brush holder assembly 810a-d and/or brush 824a-d.

In some cases, the wear state monitor 812a-d and/or the flexible sensor 815a-d may be configured differently. For example, the wear state monitor 812a and 812d may include a slot-like opening, such as the opening 225 of FIG. 2. In such cases, the electrical connections of the flexible sensors 815a, 815d may be connected internally to the wear state monitor 812a, 812d. In such cases, the flexible sensor 815a may be affixed to the spring using an adhesive and may be coated with a coating, such as Teflon, to protect the flexible sensor 815a from wear. In another example, the wear state monitor 812d may be configured to extend beyond the edge of the spring 829d such that the flexible sensor 815d may be positioned adjacent to the edge of spring 829d. In other examples, the flexible sensor 815b, 815c may include one or more wired connections that may be connected to the wear state monitor 812b, 812d. In the illustrative example of FIG. 8, the wear state monitor 812b may include two terminals on the same end of the wear state monitor 812b. However, the wear state monitor 812c may include a terminal on each end of the wear state monitor 812b. These configurations are merely illustrative and other such configurations may be used and/or contemplated.

Figure 9:
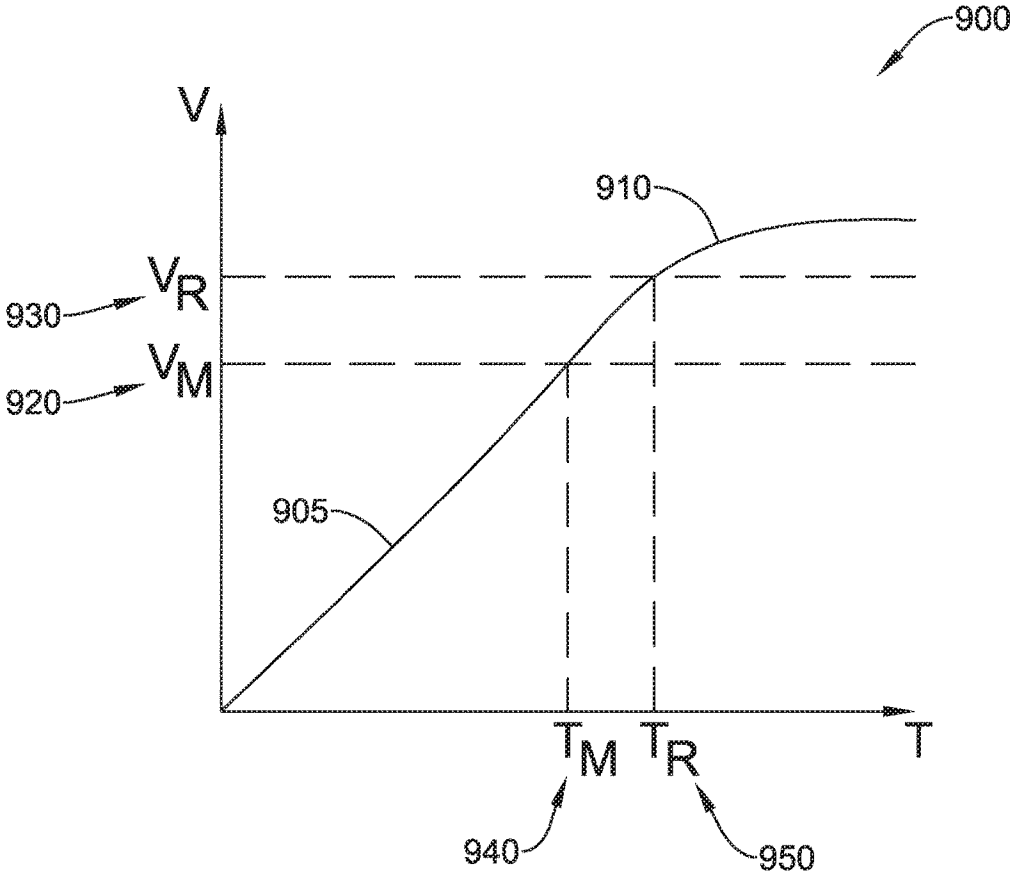
FIG. 9 shows a graph of an illustrative voltage associated with the variable resistance of the flexible sensor associated with the wear state of a carbon brush.

FIG. 9 shows a graph 900 of an illustrative voltage associated with the variable resistance of the flexible sensor 60 associated with the wear state of a brush 24 over time. As mentioned above, the flexible sensor 60 may have a variable resistance that may vary based on a bending radius applied to the flexible sensor 60. For example, if the bending radius of the flexible sensor 60 increases, then the variable resistance value of the flexible sensor 60 would increases accordingly, according to a characteristic curve of the particular flexible sensor. As such, when the flexible sensor 60 is incorporated into an electrical circuit, such as a voltage divider circuit, the voltage output from the voltage divider circuit may vary accordingly, as shown as the curve 910. In an example, an initial variable resistance value 905 may be determined when a particular flexible sensor 60 is incorporated in a brush assembly 110 that is in an engaged position. Over time, as the associated brush 24 wears, the bending radius of the flexible sensor 60 will increase. In this particular voltage divider configuration, the voltage increases. In some cases, at least two threshold voltages may be defined for monitoring the wear state of the brush 24. For example, the first threshold value, Vm 920, may be associated with a wear state approaching a replacement wear state and the second threshold value, Vr 930, may be associated with the replacement wear state. In some cases, at the time 940, an associated wear state monitor may indicate to a user that the brush 24 has reached a wear state approaching the replacement wear state. At time 950, the associated wear state monitor may indicate to a user that the brush 24 has reached the replacement wear state.

Figure 10:
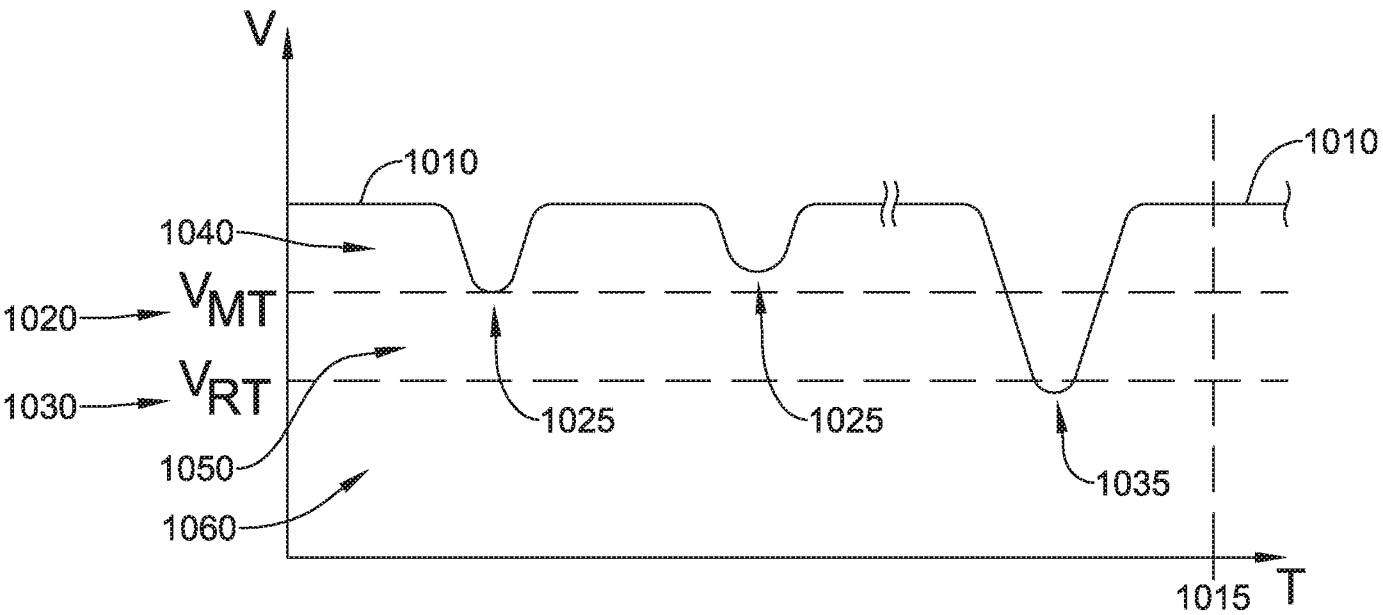
FIG. 10 shows a graph of an example of a transient voltage signal illustrative of a condition of a rotating component of an electrical machine.

FIG. 10 shows a graph 1000 of an example of a transient voltage signal 1010 illustrative of a condition of a rotating component 15 of an electrical machine. In some cases, the transient voltage signal 1010 may operate under a shorter time scale than the steady state signal. For example, the wear state monitor 50 may monitor one or more transient events occurring within a single revolution and/or over one or more revolutions of the rotating component 15. For example, the time 1015 may correspond to a time of a single revolution. For a rotating component 15 rotating at about 1000 revolutions per minute, a single revolution may occur about every 0.06 seconds. In some cases, the wear state monitor 50 may monitor transient events over multiple revolutions (e.g., two revolutions, five revolutions, ten revolutions, etc.). The transient events 1025 may be correspond to a vibration of the brush, such as when the brush 24 encounters irregularities on the surface of the rotating component 15. In some cases, two or more threshold values may be defined, such as Vmt 1020 and Vrt 1030, where Vmt 1020 corresponds to a wear state when the rotating component 15 is approaching the replacement wear state and Vrt 1030 may correspond to a replacement wear state of the rotating component 15. As can be seen, the transient event 1035 has crossed the Vrt 1030 threshold value. In such cases, the wear state monitor may indicate that the rotating component has reached the replacement wear state. In other cases, the wear state monitor may indicate that the rotating component has reached the replacement wear state after Vrt has been reached a specified number of times and/or for a specified duration. These are just some examples.

In some cases, some vibration having a small magnitude (e.g., about 0.002 inches, about 0.003 inches, etc.) of the brush may be present during normal operation. As the rotating component 15 wears, the magnitude of the vibration may change. By monitoring the magnitude of the signal representative of the vibration (e.g., the transient voltage signal 1010), the wear state of the rotating component may be inferred. For example, during normal operation vibration having a magnitude of approximately 0.005 inches or less may be considered "acceptable". As shown in FIG. 10, three wear state conditions may be inferred by monitoring the transient voltage signal 1010. For example, a first area 1040 may correspond to an "operational" wear state (e.g., vibration magnitude<about 0.005 inches), a second area 1050 corresponding to a wear state approaching a replacement wear state (e.g., a vibration magnitude between about 0.005 inches and about 0.010 inches, and a third area 1060 corresponding to a replacement wear state (e.g., a vibration magnitude>about 0.10 inches) may be defined using thresholds 1020, 1030.

Figure 11:
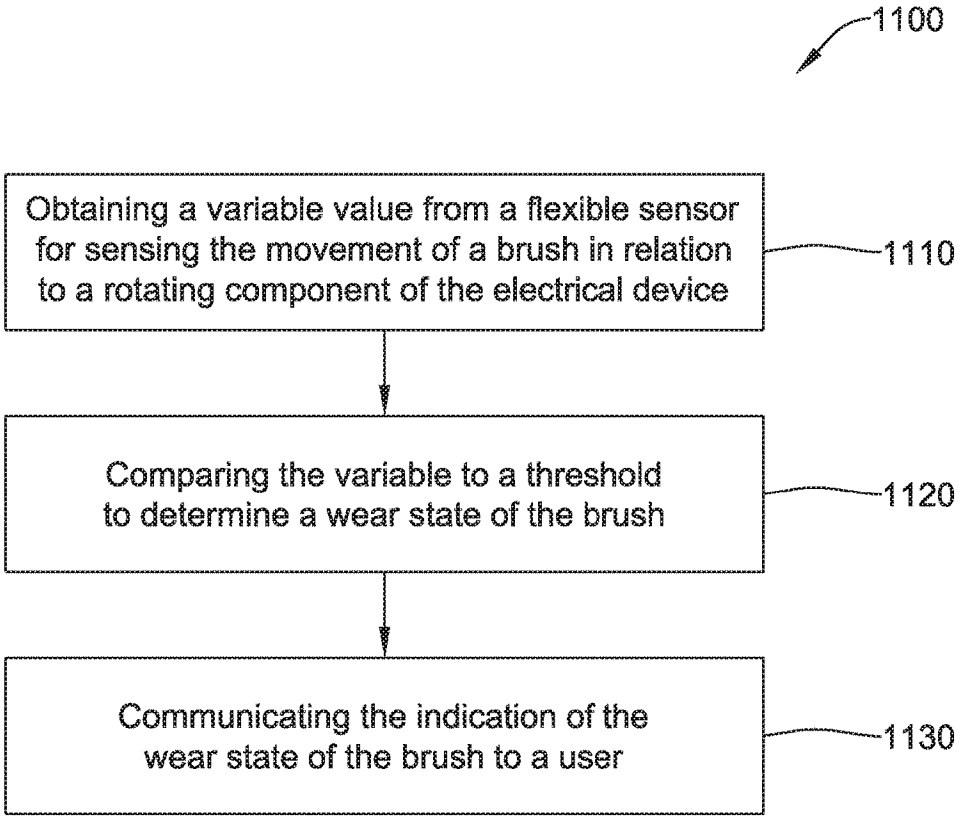
FIG. 11 shows an illustrative method for monitoring a wear state of one or more components of an electrical device.

FIG. 11 shows an illustrative method 1100 for monitoring a wear state of one or more components of an electrical device. At 1110, a wear state monitor may obtain a variable value from a flexible sensor, such as a variable resistance value, a variable voltage value and/or a variable current value. The variable voltage value and/or the variable current value may be associated with the variable resistance value of the flexible sensor. The variable value may be used to sense the movement of a carbon brush in relation to a rotating component of an electrical device, such as a slip ring of the electrical machine of FIG. 7. For example, the variable resistance may correspond to a bend radius of the flexible sensor 60 associated with the brush 24 and spring 29 of the brush holder assembly 110. Variations in bend radius may be associated with the movement of a brush and or a wear state of the brush in relation to the rotating component of the electrical device. At 1120, the variable resistance value may be compared to a threshold value to determine a wear state of the brush. The wear state of the brush may be communicated to a user, such as by a user interface that may include a visible indicator and/or an audible indicator.

In some cases, at 1130 the indication of the wear state of the brush may be communicated to a site monitoring device and/or a remote monitoring device. The remote monitoring device may be located at the same and/or at a different geographical location from the geographical location of the electrical machine and the site monitoring device.

In some cases, the wear monitor, the site monitor and/or the remote monitoring device may include a processor capable of processing instructions for predicting a life expectancy of the brush and/or the rotating component of the electrical machine using the resistance value associated with the movement of the carbon brush. In some cases, the processor may be capable of processing instructions for identifying the wear state of the carbon brush using a steady state variable resistance value and/or identifying the wear state of the rotating electrical component (e.g., a slip ring, a commutator, etc.) of the electrical device using a transient variable resistance value.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A monitoring apparatus for monitoring a carbon brush of a brush holder assembly of an electrical machine, the apparatus comprising:

a sensor *configured to move with a spring of the brush holder assembly, the sensor* having an output that varies [as a shape of the sensor varies, wherein the shape of the sensor changes] in response to movement of the carbon brush in relation to a rotating component of the electrical machine; and a signal processing circuit coupled to the sensor to receive the output, the signal processing circuit configured for determining a measure of a wear state of the carbon brush using output of the sensor,

*wherein the signal processing circuit is positionable within a coiled portion of the spring*.

2. The monitoring apparatus of claim [1] *21*, wherein the sensor has a first shape upon initial installation of the carbon brush in the electrical machine and a second shape after a particular amount of wear to the carbon brush.

3. The monitoring apparatus of claim 1, wherein the movement of the carbon brush is indicative of the wear state of the carbon brush and the sensor may be aligned along a plane after a particular amount of wear to the carbon brush.

4. The monitoring apparatus of claim [1] *21*, wherein the shape of the sensor that varies is a radius of curvature of the sensor that changes in response to movement of the carbon brush in relation to a rotating component of the electrical machine.

5. The monitoring apparatus of claim 4, wherein the sensor has a first radius of curvature upon initial installation of the carbon brush in the electrical machine and a second radius of curvature after a particular amount of wear to the carbon brush.

6. The monitoring apparatus of claim 4, wherein the output is a voltage output.

7. The monitoring apparatus of claim 6, wherein the voltage output varies as the radius of curvature of the sensor varies.

8. The monitoring apparatus of claim [1] *21*, wherein the sensor includes a flexible resistor and the output of the sensor varies in response to an electrical resistance of the flexible resistor changing due, at least in part, to changes in the shape of the sensor.

9. The monitoring apparatus of claim 1, wherein the signal processing circuit determines the measure of the wear state of the carbon brush by comparing the output of the sensor to at least one predetermined threshold value.

10. The monitoring apparatus of claim 9, wherein the at least one predetermined threshold value corresponds to a steady state measure of the output of the sensor.

11. The monitoring apparatus of claim 1, wherein the signal processing circuit determines the measure of the wear state of the carbon brush by comparing the output of the sensor to a first threshold value and determines a measure of a wear state of the rotating component of the electrical machine by comparing the output of the sensor to a second threshold value.

12. A brush holder assembly, the assembly comprising:

a brush holder for receiving and positioning a carbon brush in relation to a rotating component of an electrical machine;

a spring mounted to the brush holder, the spring for providing a force to a carbon brush received in the brush holder such that the carbon brush engages the rotating component of the electrical machine;

a sensor [positioned between the spring and the brush holder, the sensor] having an output that varies [as a shape of the sensor varies, wherein the shape of the sensor is representative of] *based on* a physical position and/or movement of a carbon brush received in the brush holder; and a wear state monitor in electrical communication with the sensor, *the wear state monitor positioned within a coiled portion of the spring,* the wear state monitor for determining a measure of a wear state of the carbon brush using the output of the sensor.

13. The assembly of claim 12, wherein the brush holder includes a mounting beam and the sensor is positioned between the mounting beam and the spring.

14. The assembly of claim [12] *22*, wherein the shape of the sensor that varies is a radius of curvature of the sensor that changes in response to movement of the carbon brush in relation to a rotating component of the electrical machine.

15. The assembly of claim 14, wherein the output is a voltage output.

16. The assembly of claim 15, wherein the voltage output varies as the radius of curvature of the sensor varies.

17. The assembly of claim [12] *22*, wherein the sensor includes a flexible resistor and the output of the sensor varies in response to an electrical resistance of the flexible resistor changing due, at least in part, to changes in the shape of the sensor.

18. The assembly of claim 12, wherein the wear state monitor is further configured to determine a wear state of the rotating component of the electrical machine using the output of the sensor.

19. A brush holder assembly having an integral sensor for monitoring a wear state of a carbon brush or a rotating component of an electrical machine, the brush holder assembly comprising:

a brush holder having a mounting beam;

a carbon brush positioned in the brush holder;

a spring coupled to the brush holder, the spring for providing a force to engage the carbon brush with a rotating component of the electrical machine;

a sensor positioned between the spring and the mounting beam, the sensor having an output that changes as a change in radius of curvature of the sensor changes;

an indicator for providing an indication of the wear state of at least one of the carbon brush and the rotating component of the electrical machine based, at least in part, on the output of the sensor.

20. The brush holder assembly of claim 19, further comprising:

a communication circuit, the communication circuit configured communicate information about the wear state of at least one of the carbon brush and the rotating component of the electrical machine to a site monitor proximate to the electrical machine.

*21. The monitoring apparatus of claim 1, wherein the output of the sensor varies as a shape of the sensor varies, wherein the shape of the sensor changes in response to movement of the carbon brush.*

*22. The brush holder assembly of claim 12, wherein the output of the sensor varies as a shape of the sensor varies, wherein the shape of the sensor changes in response to movement of the carbon brush.*

*23. A monitoring apparatus having a sensor for monitoring a wear state of a carbon brush of a brush holder assembly of an electrical machine, the monitoring apparatus comprising:*

*a sensor attachable to a spring of the brush holder assembly, wherein the sensor is configured to move with the spring;*

*a wear state monitor positionable within a coiled portion of the spring, wherein the wear state monitor is communicatively coupled to the sensor to obtain information about the wear state of the carbon brush based on movement of the spring; and*

*a power source disposed within the coiled portion of the spring to provide power to the wear state monitor.*

*24. The monitoring apparatus of claim 23, wherein the wear state monitor includes a cylindrical body designed to be captured within the coiled portion of the spring.*

*25. The monitoring apparatus of claim 24, wherein the wear state monitor includes one or more ribs used to ensure the wear state monitor remains mounted within the coiled portion of the spring.*

*26. The monitoring apparatus of claim 23, wherein the wear state monitor includes a communication circuit, the communication circuit for communicating information about a wear state of the carbon brush.*

*27. The monitoring apparatus of claim 26, wherein the communication circuit is capable of communicating via one or more wireless technologies.*

*28. The monitoring apparatus of claim 27, wherein the communication circuit is configured to wirelessly communicate the wear state of the carbon brush to a site monitor proximate to the electrical machine.*

*29. The monitoring apparatus of claim 23, wherein the wear state monitor includes a temperature sensor.*

*30. The monitoring apparatus of claim 23, wherein the wear state monitor is configured to identify a characteristic of a vibration of the carbon brush.*

*31. The monitoring apparatus of claim 23, wherein the wear state monitor includes an energy harvester.*

*32. A system for monitoring a wear state of a carbon brush of a brush holder assembly mounted on an electrical machine, the system comprising:*

*a wear state monitor positionable within a coiled portion of a spring urging the carbon brush into engagement with a rotating component of the electrical machine; and*

*a site monitor configured to receive a signal from the wear state monitor indicative of a wear state of the carbon brush;*

*wherein the wear state monitor includes a power source disposed within the coiled portion of the spring to provide power to the wear state monitor.*

*33. The system of claim 32, wherein the wear state monitor is communicatively coupled to a sensor to obtain information about the wear state of the carbon brush.*

*34. The system of claim 32, wherein the site monitor is configured to receive the signal from the wear state monitor wirelessly.*

*35. The system of claim 32, wherein the wear state monitor is configured to monitor a vibration of the carbon brush and the site monitor is configured to notify a user of excess vibration of the carbon brush.*

*36. The system of claim 32, wherein the wear state monitor includes a temperature sensor and the site monitor is configured to notify a user of excess heating of the brush holder assembly.*

*37. The system of claim 32, wherein the wear state monitor includes an energy harvester.*

*38. A method for monitoring a wear state of a carbon brush of a brush holder assembly mounted on an electrical machine, the method comprising:*

*obtaining a signal from a sensor attached to a spring of the brush holder assembly, the spring urging the carbon brush into engagement with a rotating component of the electrical machine, wherein the signal is proportional to linear movement of the carbon brush relative to a brush holder of the brush holder assembly surrounding the carbon brush;*

*processing the signal with a wear state monitor positioned within the coiled portion of the spring to determine a wear state of the carbon brush, wherein the wear state monitor includes a power source disposed within the coiled portion of the spring to provide power to the wear state monitor; and*

*communicating the wear state of the carbon brush to a site monitor in proximity to the electrical machine.*

*39. The method of claim 38, further comprising:*

*displaying an indication of the wear state of the carbon brush on a display of the site monitor.*

*40. The method of claim 38, further comprising:*

*displaying a predicted life expectancy of the carbon brush on a display of the site monitor.*

*41. The method of claim 38, wherein the signal varies based on movement of the sensor with the spring.*

*42. The method of claim 38, further comprising:*

*monitoring a vibration of the carbon brush with the wear state monitor.*

*43. The method of claim 38, wherein the wear state monitor includes an energy harvester.*

*44. A brush holder assembly for monitoring a wear state of a carbon brush of an electrical machine, the brush holder assembly comprising:*

*a carbon brush;*

*a spring associated with the carbon brush, the spring applying a force to a top surface of the carbon brush to engage the carbon brush with a rotating component of the electrical machine; and*

*a wear state monitor positioned within a coiled portion of the spring;*

*wherein the wear state monitor includes a power source disposed within the coiled portion of the spring to provide power to the wear state monitor.*

*45. The brush holder assembly of claim 44, wherein the wear state monitor includes a cylindrical body designed to be captured within the coiled portion of the spring.*

*46. The brush holder assembly of claim 44, wherein the wear state monitor includes a communication circuit, the communication circuit for communicating information about a wear state of the carbon brush.*

*47. The brush holder assembly of claim 44, wherein the wear state monitor includes one or more environmental sensors, wherein the one or more environmental sensors includes a temperature sensor.*

*48. The brush holder assembly of claim 44, wherein the wear state monitor is configured to identify a characteristic of a vibration of the carbon brush.*

*49. The brush holder assembly of claim 44, wherein the wear state monitor includes an energy harvester.*

* * * * *